(12) United States Patent
Chitalia et al.

(10) Patent No.: US 11,165,631 B1
(45) Date of Patent: *Nov. 2, 2021

(54) IDENTIFYING A ROOT CAUSE OF ALERTS WITHIN VIRTUALIZED COMPUTING ENVIRONMENT MONITORING SYSTEM

(71) Applicant: Juniper Networks, Inc., Sunnyvale, CA (US)

(72) Inventors: Harshit Naresh Chitalia, Mountain View, CA (US); Srivignessh Pacham Sri Srinivasan, Sunnyvale, CA (US); Tarun Banka, Milpitas, CA (US); Travis Gregory Newhouse, Encinitas, CA (US); Sumeet Singh, Saratoga, CA (US); Pawan Prakash, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/783,689

(22) Filed: Feb. 6, 2020

Related U.S. Application Data

(63) Continuation of application No. 15/730,372, filed on Oct. 11, 2017, now Pat. No. 10,560,309.

(51) Int. Cl.
*H04L 12/24* (2006.01)
*G06F 11/07* (2006.01)

(52) U.S. Cl.
CPC ........ *H04L 41/0631* (2013.01); *G06F 11/079* (2013.01); *G06F 11/0712* (2013.01);
(Continued)

(58) Field of Classification Search
CPC ............... H04L 41/0631; H04L 41/069; H04L 41/0681; H04L 41/0686; G06F 11/079
See application file for complete search history.

(56) References Cited

U.S. PATENT DOCUMENTS

| 8,086,708 | B2 * | 12/2011 | Breitgand | H04L 41/5009 709/223 |
| 8,762,694 | B1 * | 6/2014 | Zou | G06F 9/4843 712/244 |

(Continued)

FOREIGN PATENT DOCUMENTS

WO 2013184846 A1 12/2013

OTHER PUBLICATIONS

Hopps, "Analysis of an Equal-Cost Multi-Path Algorithm," RFC 2992, Network Working Group, Nov. 2000, 8 pp.
(Continued)

*Primary Examiner* — Minh Chau Nguyen
(74) *Attorney, Agent, or Firm* — Shumaker & Sieffert, P.A.

(57) ABSTRACT

This disclosure describes techniques for analyzing information generated as a result of monitoring resources within computing environments. In one example, this disclosure describes a method that includes observing a plurality of alerts generated in response to monitoring resources associated with a plurality of connected elements within a network; determining a plurality of occurrence counts; determining a plurality of concurrent occurrence counts, wherein each of the plurality of concurrent occurrence counts represents a count of concurrent occurrences of two or more of the alerts in the set of historical alerts; and identifying one or more root cause alerts, wherein the one or more root cause alerts are determined based on the plurality of occurrence counts and the plurality of the concurrent occurrence counts, and wherein the one or more root cause alerts are a subset of the plurality of alerts.

17 Claims, 9 Drawing Sheets

(52) U.S. Cl.
CPC ........ *H04L 41/069* (2013.01); *H04L 41/0681* (2013.01); *H04L 41/0686* (2013.01)

(56) References Cited

U.S. PATENT DOCUMENTS

| | | | |
|---|---|---|---|
| 9,641,435 B1 | 5/2017 | Sivaramakrishnan | |
| 10,382,331 B1 | 8/2019 | Sivaramakrishnan | |
| 10,547,521 B1 | 1/2020 | Roy et al. | |
| 2007/0208438 A1* | 9/2007 | El-Mankabady | G05B 15/02 |
| | | | 700/83 |
| 2009/0222795 A1* | 9/2009 | Frank | G06F 8/44 |
| | | | 717/127 |
| 2019/0026459 A1* | 1/2019 | Harutyunyan | H04L 41/0627 |

OTHER PUBLICATIONS

U.S. Appl. No. 15/637,686, by Juniper Networks, Inc. (Inventors: Chitalia et al.), filed Jun. 29, 2017.

Prosecution History for U.S. Appl. No. 15/730,372, by Juniper Networks, Inc. (Inventors: Chitalia et al.), dated Apr. 8, 2019 to Oct. 31, 2019.

\* cited by examiner

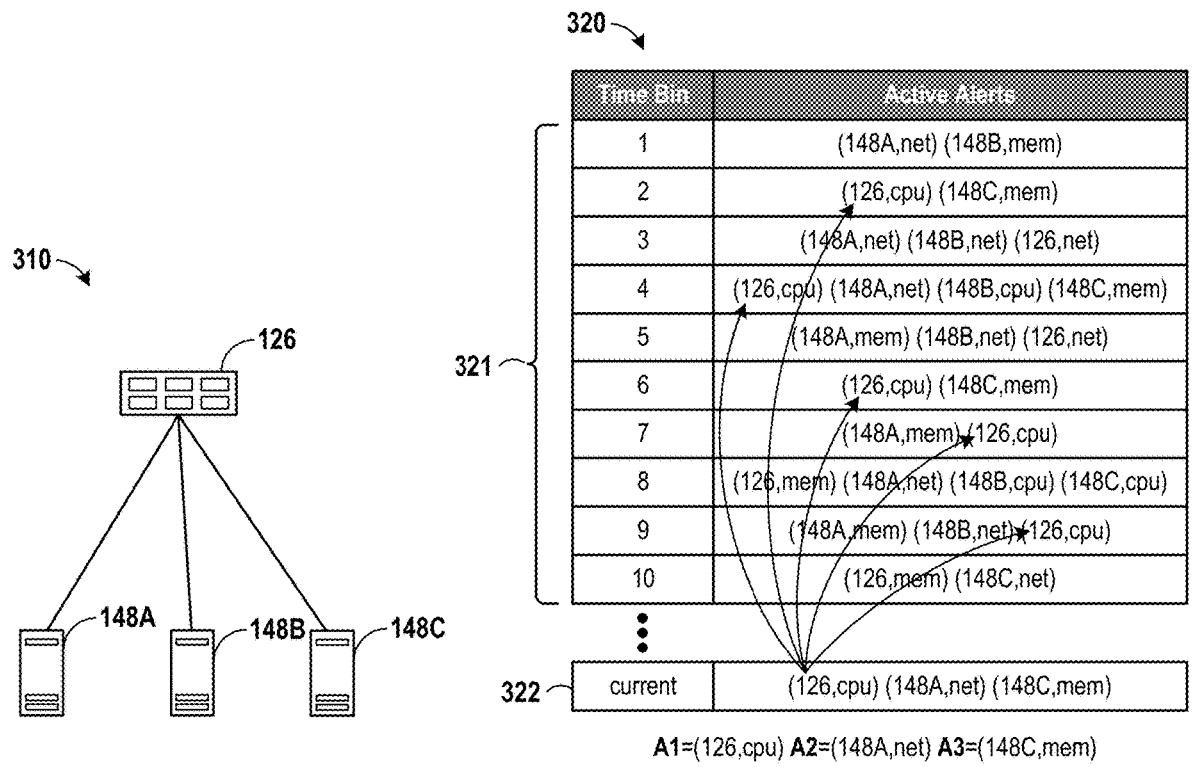
FIG. 3A
FIG. 3B
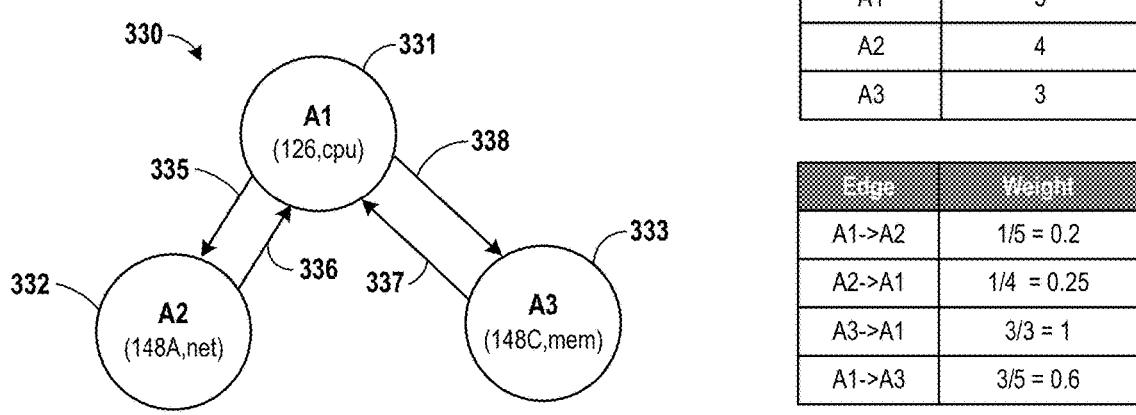
FIG. 3C
FIG. 3D

IDENTIFYING A ROOT CAUSE OF ALERTS WITHIN VIRTUALIZED COMPUTING ENVIRONMENT MONITORING SYSTEM

CROSS REFERENCE

This application is a continuation application of and claims priority to U.S. patent application Ser. No. 15/730,372 filed on Oct. 11, 2017, which is hereby incorporated by reference herein in its entirety.

TECHNICAL FIELD

This disclosure relates to visualizing, monitoring and improving performance of cloud data centers and networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

Some data centers include mechanisms for monitoring resources within a data center, and generating alarms or alerts to performance and other issues. Although alarms and alerts can be helpful in identifying performance and other issues, for complex distributed systems, some performance and other issues can result in a large number of alarms and/or alerts being generated.

SUMMARY

This disclosure describes techniques for analyzing information generated as a result of monitoring resources within computing environments, such as virtualization infrastructures deployed within data centers. In some examples described herein, resources within a computing infrastructure may be monitored (e.g., for performance and utilization), and based on the monitoring, various alarms, alerts, or other notifications may be generated. In some situations, when a performance or other issue arises within a computing environment, the notifications generated in response might be so numerous as to complicate diagnosis or remediation, at least partially because many of the notifications might be reporting symptoms of a problem caused by a small number of elements or resources within the computing environment. Techniques described herein include technical procedures for automating the identification of one or a subset of the notifications that may be a root cause of other generated notifications. By focusing remediation efforts on the root cause(s), resolution of performance and other issues may be easier, more efficient, and less time-consuming.

In one example, this disclosure describes a method comprising observing, by a computing system and over a plurality of time bins, a plurality of alerts generated in response to monitoring resources associated with a plurality of connected elements within a network, wherein each of the plurality of alerts occurs within one or more of the plurality of time bins; determining, by the computing system, an occurrence count for each of the plurality of alerts, wherein the occurrence count represents a count of the time bins in which a respective alert occurs; determining, by the computing system, a concurrent occurrence count for each pair of alerts within the plurality of alerts, wherein the concurrent occurrence count represents a count of the time bins during which both alerts within the corresponding pair of alerts occurs; identifying, by the computing system and based on the occurrence count for each of the plurality of alerts and the concurrent occurrence count for each pair of alerts, a root cause alert included within the plurality of alerts; and outputting, by the computing system, a user interface identifying the root cause alert included in the plurality of alerts.

In another example, this disclosure describes a computing system comprising: a storage device; and processing circuitry having access to the storage device and configured to: observe, over a plurality of time bins, a plurality of alerts generated in response to monitoring resources associated with a plurality of connected elements within a network, wherein each of the plurality of alerts occurs within one or more of the plurality of time bins, determine an occurrence count for each of the plurality of alerts, wherein the occurrence count represents a count of the time bins in which a respective alert occurs, determine a concurrent occurrence count for each pair of alerts within the plurality of alerts, wherein the concurrent occurrence count represents a count of the time bins during which both alerts within the corresponding pair of alerts occurs, identify, based on the occurrence count for each of the plurality of alerts and the concurrent occurrence count for each pair of alerts, a root cause alert included within the plurality of alerts, and output a user interface identifying the root cause alert included in the plurality of alerts.

In another example, this disclosure describes a computer-readable storage medium comprising instructions that, when executed, configure processing circuitry of a computing system to: observe, over a plurality of time bins, a plurality of alerts generated in response to monitoring resources associated with a plurality of connected elements within a network; wherein each of the plurality of alerts occurs within one or more of the plurality of time bins, determine an occurrence count for each of the plurality of alerts, wherein the occurrence count represents a count of the time bins in which a respective alert occurs; determine a concurrent occurrence count for each pair of alerts within the plurality of alerts, wherein the concurrent occurrence count represents a count of the time bins during which both alerts within the corresponding pair of alerts occurs; identify, based on the occurrence count for each of the plurality of alerts and the concurrent occurrence count for each pair of alerts, a root cause alert included within the plurality of alerts; and output a user interface identifying the root cause alert included in the plurality of alerts.

The details of one or more examples of the disclosure are set forth in the accompanying drawings and the description

BRIEF DESCRIPTION OF THE DRAWINGS

FIG. 3A, FIG. 3B, FIG. 3C, and FIG. 3D are conceptual diagrams illustrating an example procedure for identifying one of three alerts as being a root cause alert, in accordance with one or more aspects of the present disclosure.

DETAILED DESCRIPTION

In cloud deployments, notifications, such as alerts, can be a powerful tool to identify performance issues. In some systems, alerts can be configured relative to various system resources (CPU, memory, network, etc), and be used to notify cloud operators about performance, utilization, and other issues. In a complex distributed system, such as a cloud environment, the number of these alerts could be very large, and analyzing each of the triggered alerts might be difficult and impractical. Moreover, the root cause of these alerts might be limited to a few elements and/or resources. Often, it is prudent to diagnose and localize those root causes. Statistical learning techniques can be applied to learn from a set of historical alerts and detect root causes of a set of active, current alerts. Alerts generated in cloud environments could indicate a one-time anomaly in the system or could indicate a recurring problem. In accordance with one or more aspects of the present disclosure, systems described herein may apply a two-step approach: (1) learn from historical data to categorize alerts, and (2) use the categorized information to identify a set of root cause alerts from a larger set of alerts.

This disclosure describes techniques for analyzing alerts that each may be associated with a metric, an element type, and an element identifier. Alerts may be associated with a particular time and/or within a particular time window. Techniques described herein may enable determining a "minimal" set of elements that are likely a root cause for at least some of a set of active alerts. The minimal set of elements may be further associated with a particular time or within a particular time window. Accordingly, after performing processing consistent with one or more techniques described herein, a set of elements and/or resource can be identified that are likely a root cause for the set of active alerts.

Figure 1:
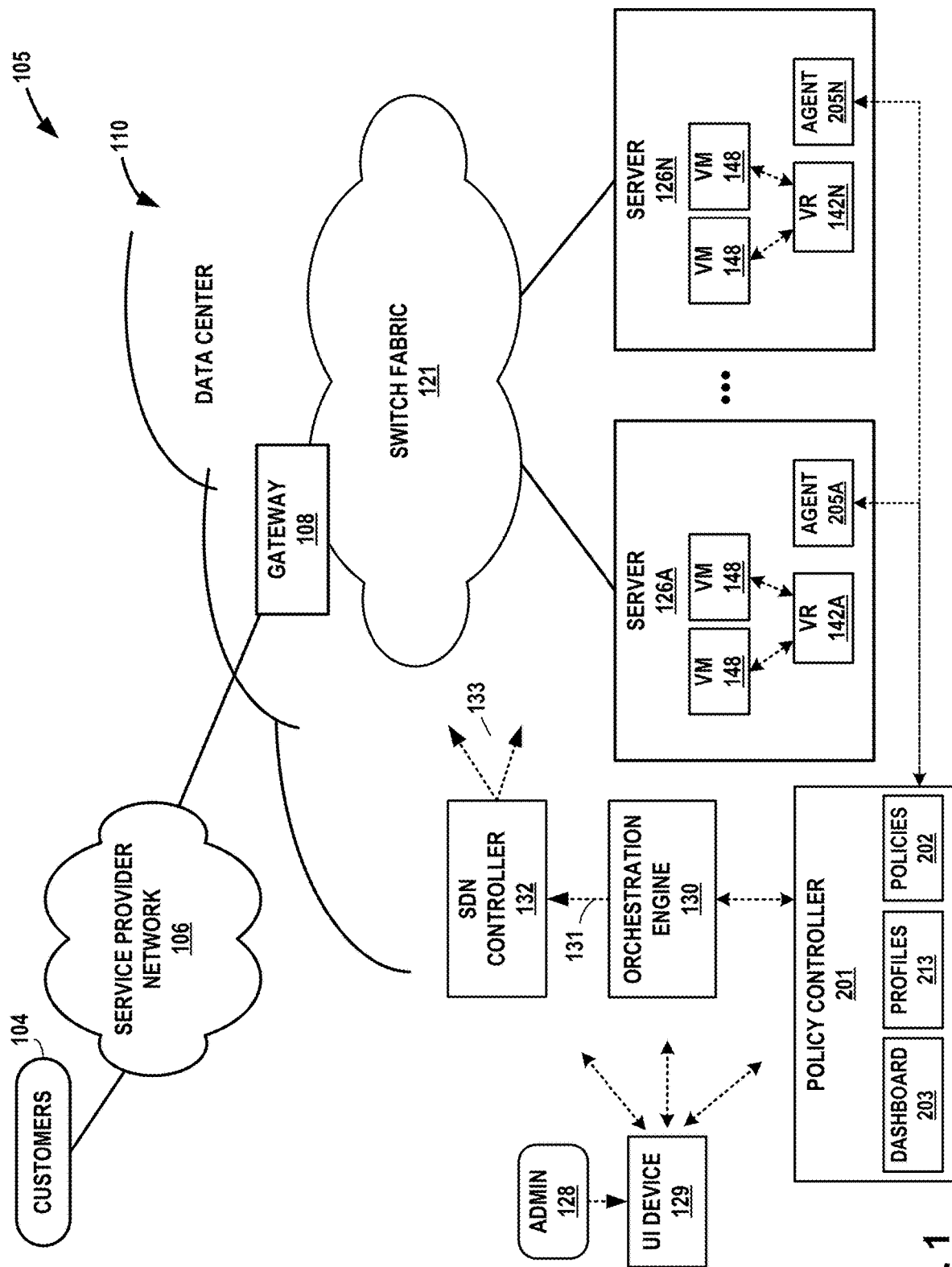
FIG. 1 is a conceptual diagram illustrating an example network that includes an example data center in which performance and usage metrics for infrastructure elements for cloud-based computing environments are monitored, and optionally including internal processor metrics relating to resources shared by multiple processes, in accordance with one or more aspects of the present disclosure.

FIG. 1 is a conceptual diagram illustrating an example network 105 that includes an example data center 110 in which performance and usage metrics for infrastructure elements for cloud-based computing environments are monitored, and optionally including internal processor metrics relating to resources shared by multiple processes, in accordance with one or more aspects of the present disclosure. FIG. 1 illustrates one example implementation of network 105 and data center 110 that hosts one or more cloud-based computing networks, computing domains or projects, generally referred to herein as cloud computing cluster. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of network 105 and data center 110 may be appropriate in other instances. Such implementations may include a subset of the components included in the example of FIG. 1 and/or may include additional components not shown in FIG. 1.

In the example of FIG. 1, data center 110 provides an operating environment for applications and services for customers 104 coupled to data center 110 by service provider network 106. Although functions and operations described in connection with network 105 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 110 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 110 may represent one of many geographically distributed network data centers. As illustrated in the example of FIG. 1, data center 110 is a facility that provides network services for customers 104. Customers 104 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 110 is an individual network server, a network peer, or otherwise.

In the example of FIG. 1, data center 110 includes a set of storage systems and application servers, including server 126A through server 126N (collectively "servers 126") interconnected via high-speed switch fabric 121 provided by one or more tiers of physical network switches and routers. Servers 126 function as physical compute nodes of the data center. For example, each of servers 126 may provide an operating environment for execution of one or more customer-specific virtual machines 148 ("VMs" in FIG. 1) or other virtualized instances, such as containers. Each of servers 126 may be alternatively referred to as a host computing device or, more simply, as a host. A server 126 may execute one or more virtualized instances, such as virtual machines, containers, or other virtual execution environment for running one or more services, such as virtualized network functions (VNFs).

Although not shown, switch fabric 121 may include top-of-rack (TOR) switches coupled to a distribution layer of chassis switches, and data center 110 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 110 and customers 104 by service provider network 106. Gateway 108 acts to forward and receive packets between switch fabric 121 and service provider network 106.

Software-Defined Networking ("SDN") controller 132 provides a logically and in some cases physically centralized controller for facilitating operation of one or more virtual networks within data center 110 in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via northbound API 131, which in turn operates in response to configuration input received from an administrator 128 interacting with and/or operating user interface device 129. Additional information regarding SDN controller 132 operating in conjunction with other devices of data center 110 or other software-defined network is found in International Application Number PCT/US 2013/044378, filed Jun. 5, 2013, and entitled PHYSICAL PATH DETERMINATION FOR VIRTUAL NETWORK PACKET FLOWS, which is incorporated by reference as if fully set forth herein.

User interface device 129 may be implemented as any suitable device for interacting presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure. In some examples, user interface device 129 may be physically separate from and/or in a different location than policy controller 201. In such examples, user interface device 129 may communicate with policy controller 201 over a network or other means of communication. In other examples, user interface device 129 may be a local peripheral of policy controller 201, or may be integrated into policy controller 201.

In some examples, orchestration engine 130 manages functions of data center 110 such as compute, storage, networking, and application resources. For example, orchestration engine 130 may create a virtual network for a tenant within data center 110 or across data centers. Orchestration engine 130 may attach virtual machines (VMs) to a tenant's virtual network. Orchestration engine 130 may connect a tenant's virtual network to an external network, e.g. the Internet or a VPN. Orchestration engine 130 may implement a security policy across a group of VMs or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 126 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches, chassis switches, and switch fabric 121; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 121 or between servers 126 and customers 104 or between servers 126, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Virtual routers 142 (virtual router 142A to virtual router 142N, collectively "virtual routers 142" in FIG. 1) execute multiple routing instances for corresponding virtual networks within data center 110 and routes the packets to appropriate virtual machines executing within the operating environment provided by servers 126. Each of servers 126 may include a virtual router. Packets received by virtual router 142A of server 126A, for instance, from the underlying physical network fabric may include an outer header to allow the physical network fabric to tunnel the payload or "inner packet" to a physical network address for a network interface of server 126A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of servers 126 may receive inbound tunnel packets of a packet flow from one or more TOR switches within switch fabric 121 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 126 are described in U.S. patent application Ser. No. 14/228,844, entitled "PACKET SEGMENTATION OFFLOAD FOR VIRTUAL NETWORKS," incorporated herein by reference.

In some example implementations, virtual routers 142 executing on servers 126 steer received inbound tunnel packets among multiple processor cores to facilitate packet processing load balancing among the cores when processing the packets for routing to one or more virtual and/or physical machines. As one example, server 126A includes multiple network interface cards and multiple processor cores to execute virtual router 142A and steers received packets among multiple processor cores to facilitate packet processing load balancing among the cores. For instance, a particular network interface card of server 126A may be associated with a designated processor core to which the network interface card directs all received packets. The various processor cores, rather than processing each of the received packets, offloads flows to one or more other processor cores, in accordance with a hash function applied to at least one of the inner and outer packet headers, for processing to take advantage of available work cycles of the other processor cores.

In the example of FIG. 1, data center 110 further includes a policy controller 201 that provides monitoring, scheduling, and performance management for data center 110. Policy controller 201 interacts with monitoring agents 205 that are deployed within at least some of the respective physical servers 216 for monitoring resource usage of the physical compute nodes as well as any virtualized host, such as VM 148, executing on the physical host. In this way, monitoring agents 205 provide distributed mechanisms for collecting a wide variety of usage metrics as well as for local enforcement of policies installed by policy controller 201. In example implementations, monitoring agents 205 run on the lowest level "compute nodes" of the infrastructure of data center 110 that provide computational resources to execute application workload. A compute node may, for example, be a bare-metal host of server 126, a virtual machine 148, a container or the like.

Policy controller 201 obtains the usage metrics from monitoring agents 205 and constructs a dashboard 203 (e.g., a set of user interfaces) to provide visibility into operational performance and infrastructure resources of data center 110. Policy controller 201 may, for example, communicate dashboard 203 to UI device 129 for display to administrator 128. In addition, policy controller 201 may apply analytics and machine learning to the collected metrics to provide near or seemingly near real-time and historic monitoring, performance visibility and dynamic optimization to improve orchestration, security, accounting and planning within data center 110.

As shown in the example of FIG. 1, Policy controller 201 may define and maintain a rule base as a set of policies 202. Policy controller 201 may administer control of each of servers 126 based on the set of policies 202 policy controller 201. Policies 202 may be created or derived in response to input by administrator 128 or in response to operations performed by policy controller 201. Policy controller 201 may, for example, observe operation of data center 110 over time and apply machine learning techniques to generate one or more policies 202. Policy controller 201 may periodically, occasionally, or continually refine policies 202 as further observations about data center 110 are made.

Policy controller 201 (e.g., an analytics engine within policy controller 201) may determine how policies are deployed, implemented, and/or triggered at one or more of servers 126. For instance, policy controller 201 may be configured to push one or more policies 202 to one or more of the policy agents 205 executing on servers 126. Policy controller 201 may receive information about internal processor metrics from one or more of policy agents 205, and determine if conditions of a rule for the one or more metrics are met. Policy controller 201 may analyze the internal processor metrics received from policy agents 205, and based on the analysis, instruct or cause one or more policy agents 205 to perform one or more actions to modify the operation of the server associated with a policy agent.

In some examples, policy controller 201 may be configured to determine and/or identify elements in the form of the virtual machines, containers, services, and/or applications executing on each of servers 126. As used herein, a resource generally refers to a consumable component of the virtualization infrastructure, i.e., a component that is used by the infrastructure, such as CPUs, memory, disk, disk I/O, network I/O, virtual CPUs, and Contrail vrouters. A resource may have one or more characteristics each associated with a metric that is analyzed by the policy agent 205 (and/or policy controller 201) and optionally reported. Lists of example raw metrics for resources are described below with respect to FIG. 2.

In general, an infrastructure element, also referred to herein as an element, is a component of the infrastructure that includes or consumes consumable resources in order to operate. Example elements include hosts, physical or virtual network devices, instances (e.g., virtual machines, containers, or other virtual operating environment instances), aggregates, projects, and services. In some cases, an element may be a resource for another element. Virtual network devices may include, e.g., virtual routers and switches, vRouters, vSwitches, Open Virtual Switches, and Virtual Tunnel Forwarders (VTFs). A metric is a value that measures the amount of a resource, for a characteristic of the resource, that is consumed by an element.

Policy controller 201 may also analyze internal processor metrics received from policy agents 205, and classify one or more virtual machines 148 based on the extent to which each virtual machine uses shared resources of servers 126 (e.g., classifications could be CPU-bound, cache-bound, memory-bound). Policy controller 201 may interact with orchestration engine 130 to cause orchestration engine 130 to adjust, based on the classifications of virtual machines 148 executing on servers 126, the deployment of one or more virtual machines 148 on servers 126.

Policy controller 201 may be further configured to report information about whether the conditions of a rule are met to a client interface associated with user interface device 129. Alternatively, or in addition, policy controller 201 may be further configured to report information about whether the conditions of a rule are met to one or more policy agents 205 and/or orchestration engine 130.

Policy controller 201 may be implemented as or within any suitable computing device, or across multiple computing devices. Policy controller 201, or components of policy controller 201, may be implemented as one or more modules of a computing device. In some examples, policy controller 201 may include a number of modules executing on a class of compute nodes (e.g., "infrastructure nodes") included within data center 110. Such nodes may be OpenStack infrastructure service nodes or Kubernetes master nodes, and/or may be implemented as virtual machines. In some examples, policy controller 201 may have network connectivity to some or all other compute nodes within data center 110, and may also have network connectivity to other infrastructure services that manage data center 110.

One or more policies 202 may include instructions to cause one or more policy agents 205 to monitor one or more metrics associated with servers 126. One or more policies 202 may include instructions to cause one or more policy agents 205 to analyze one or more metrics associated with servers 126 to determine whether the conditions of a rule are met. One or more policies 202 may alternatively, or in addition, include instructions to cause policy agents 205 to report one or more metrics to policy controller 201, including whether those metrics satisfy the conditions of a rule associated with one or more policies 202. The reported information may include raw data, summary data, and sampling data as specified or required by one or more policies 202.

Dashboard 203 may, in some examples, be considered a collection of collection of user interfaces presenting information about metrics, alarms, notifications, reports, and other information about data center 110. Dashboard 203 may include one or more user interfaces that are presented by user interface device 129. Dashboard 203 may be created, updated, and/or maintained primarily by policy controller 201 or by a dashboard module executing on policy controller 201. In some examples, dashboard 203 may be created, updated, and/or maintained primarily by a dashboard module executing on policy controller 201. Dashboard 203 and an associated dashboard module may be collectively implemented through a software object instantiated in memory having associated data and/or executable software instructions that provide output data for rendering on a display. Throughout this specification, reference may be made to dashboard 203 performing one or more functions, and in such cases, dashboard 203 refers to both a dashboard module and a collection of dashboard user interfaces and related data.

User interface device 129 may detect interactions with user interfaces from dashboard 203 as user input (e.g., from administrator 128). Policy controller may, in response to user interactions with dashboard 203, cause configurations to be made to aspects of data center 110 or projects executing on one or more virtual machines 148 of data center 110 relating to network resources, data transfer limitations or costs, storage limitations or costs, and/or accounting reports.

Dashboard 203 may include a graphical view that provides a quick, visual overview of resource utilization by instance using histograms. The bins of such histograms may represent the number of instances that used a given percentage of a resource, such CPU utilization. By presenting data using histograms, dashboard 203 presents information in a way that allows administrator 128, if dashboard 203 is presented at user interface device 129, to quickly identify patterns that indicate under-provisioned or over-provisioned instances. In some examples, dashboard 203 may highlight resource utilization by instances on a particular project or host, or total resource utilization across all hosts or projects, so that administrator 128 may understand the resource utilization in context of the entire infrastructure.

Dashboard 203 may include information relating to costs for use of compute, network, and/or storage resources, as well as costs incurred by a project. Dashboard 203 may also present information about the health and risk for one or more virtual machines 148 or other resources within data center 110. In some examples, "health" may correspond to an indicator that reflects a current state of one or more virtual machines 148. For example, an example virtual machine that exhibits a health problem may be currently operating outside of user-specified performance policy. "Risk" may correspond to an indicator that reflects a predicted future state of one or more virtual machines 148, such that an example virtual machine that exhibits a risk problem may be may be unhealthy in the future. Health and risk indicators may be determined based on monitored metrics and/or alarms corresponding to those metrics. For example, if policy agent 205 is not receiving heartbeats from a host, then policy agent 205 may characterize that host and all of its instances as unhealthy. Policy controller 201 may update dashboard 203 to reflect the health of the relevant hosts, and may indicate that reason for the unhealthy state is one or more "missed heartbeats."

Dashboard 203 may include user interfaces that present information about utilization of a network, virtualization infrastructure, cluster, or other computing environment. In some examples, utilization information for one or more infrastructure elements may be presented as color and/or a range indicator that corresponds to a metric value for that infrastructure element. The range indicator may be used in a user interface that includes a heat map, where for one or more utilization metrics, infrastructure elements experiencing high utilization are presented in a manner that is visually distinct from infrastructure elements experiencing low utilization (e.g., red for high utilization and green for low utilization). Such user interfaces may enable hierarchical views of infrastructure elements (e.g., parent/child relationships and/or network topologies), and may enable filtering of infrastructure elements with respect to utilization metrics.

One or more policy agents 205 may execute on one or more of servers 126 to monitor some or all of the performance metrics associated with servers 126 and/or virtual machines 148 executing on servers 126. Policy agents 205 may analyze monitored information and/or metrics and generate operational information and/or intelligence associated with an operational state of servers 126 and/or one or more virtual machines 148 executing on such servers 126. Policy agents 205 may interact with a kernel operating on one or more servers 126 to determine, extract, or receive internal processor metrics associated with use of shared resources by one or more processes and/or virtual machines 148 executing at servers 126. Policy agents 205 may perform monitoring and analysis locally at each of servers 126. In some examples, policy agents 205 may perform monitoring and/or analysis in a near and/or seemingly real-time manner.

In the example of FIG. 1, and in accordance with one or more aspects of the present disclosure, policy agents 205 may monitor servers 126. For example, policy agent 205A of server 126A may interact with components, modules, or other elements of server 126A and/or one or more virtual machines 148 executing on servers 126. Policy agent 205A may, as a result of such interactions, collect information about one or more metrics associated with servers 126 and/or virtual machines 148. Such metrics may be raw metrics, which may be based directly or read directly from servers 126, virtual machines 148, and/or other components of data center 110; such metrics may alternatively, or in addition, be SNMP metrics and/or telemetry-based metrics. In some examples, one or more of such metrics may be calculated metrics, which include those derived from raw metrics. In some examples, metrics may correspond to a percentage of total capacity relating to a particular resource, such as a percentage of CPU utilization, or CPU consumption, or Level 3 cache usage. However, metrics may correspond to other types of measures, such as how frequent one or more virtual machines 148 are reading and writing to memory.

Policy controller 201 may configure policy agents 205 to monitor for conditions that trigger an alarm. For example, policy controller 201 may detect input from user interface device 129 that policy controller 201 determines corresponds to user input. Policy controller 201 may further determine that the user input corresponds to information sufficient to configure a user-specified alarm that is based on values for one or more metrics. Policy controller 201 may process the input and generate one or more policies 202 that implements the alarm settings. In some examples, such policies 202 may be configured so that the alarm is triggered when values of one or more metrics collected by policy agents 205 at servers 126 exceed a certain threshold. Policy controller 201 may communicate information about the generated policies 202 to one or more policy agents 205 executing on servers 126. Policy agents 205 may monitor servers 126 for conditions on which the alarm is based, as specified by the policies 202 received from policy controller 201.

For instance, policy agent 205A may monitor one or more metrics at server 126A. Such metrics may involve server 126A, all virtual machines 148 executing on server 126A, and/or specific instances of virtual machines 148. Policy agent 205A may determine, based on the monitored metrics, that one or more values exceed a threshold set by or more policies 202 received from policy controller 201. For instance, policy agent 205A may determine whether CPU usage exceeds a threshold set by a policy (e.g., server 126A CPU usage >50%). In other examples policy agent 205A may evaluate whether one or more metrics is less than a threshold value (e.g., if server 126A available disk space <20%, then raise an alert), or is equal to a threshold value (e.g., if the number of instances of virtual machines 148 equals 20, then raise an alert). If policy agent 205A determines that the monitored metric triggers the threshold value, policy agent 205A may raise an alarm condition and communicate information about the alarm to policy controller 201. Policy controller 201 and/or policy agent 205A may act on the alarm, such as by generating a notification. Policy controller 201 may update dashboard 203 to include the notification. Policy controller 201 may cause updated dashboard 203 to be presented at user interface device 129, thereby notifying administrator 128 of the alarm condition.

In some examples, policy controller 201 may generate policies and establish alarm conditions without user input. For example, policy controller 201 may apply analytics and machine learning to metrics collected by policy agents 205. Policy controller 201 may analyze the metrics collected by policy agents 205 over various time periods. Policy controller 201 may determine, based on such analysis, information sufficient to configure an alarm for one or more metrics. Policy controller 201 may process the information and generate one or more policies 202 that implements the alarm settings. Policy controller 201 may communicate information about the policy to one or more policy agents 205 executing on servers 126. Each of policy agents 205 may thereafter monitor conditions and respond to conditions that trigger an alarm pursuant to the corresponding policies 202 generated without user input.

In some examples, policy controller 201 generates profiles 213 for elements of data center 110. A profile is associated with an element or group of elements and is a collection of alarms to be evaluated against corresponding metrics for the alarms to determine whether the associated element or group of elements is "active" or "inactive."

For example, policy controller 201, in response to input received via UI device 129, may generate profiles 213 for respective hosts, instances (e.g., VMs 148), network devices, groups thereof, and resources thereof (e.g., CPU, memory, disk, network interface, etc.). Moreover, a user or administrator configures elements of data center 110 to be members of one or more groups of elements such that the elements and groups and have a "member-of" relationship. As examples, an OpenStack host (e.g., any of servers 126) can be a member of one or more "host aggregates" that are each groups of one or more hosts. A Kubernetes container can be a member of (1) a pod, (2) a replication controller, (3) a namespace, and (4) several different services. A virtual machine 148A can be configured as a member of one or more "instance aggregates" that are each groups of one or more instances. A network device can be configured as a member of one or more "network device aggregates" that are each groups of one or more network devices. In each of the above examples, a user or agent may define profiles 213 for each element and group of elements.

Figure 2:
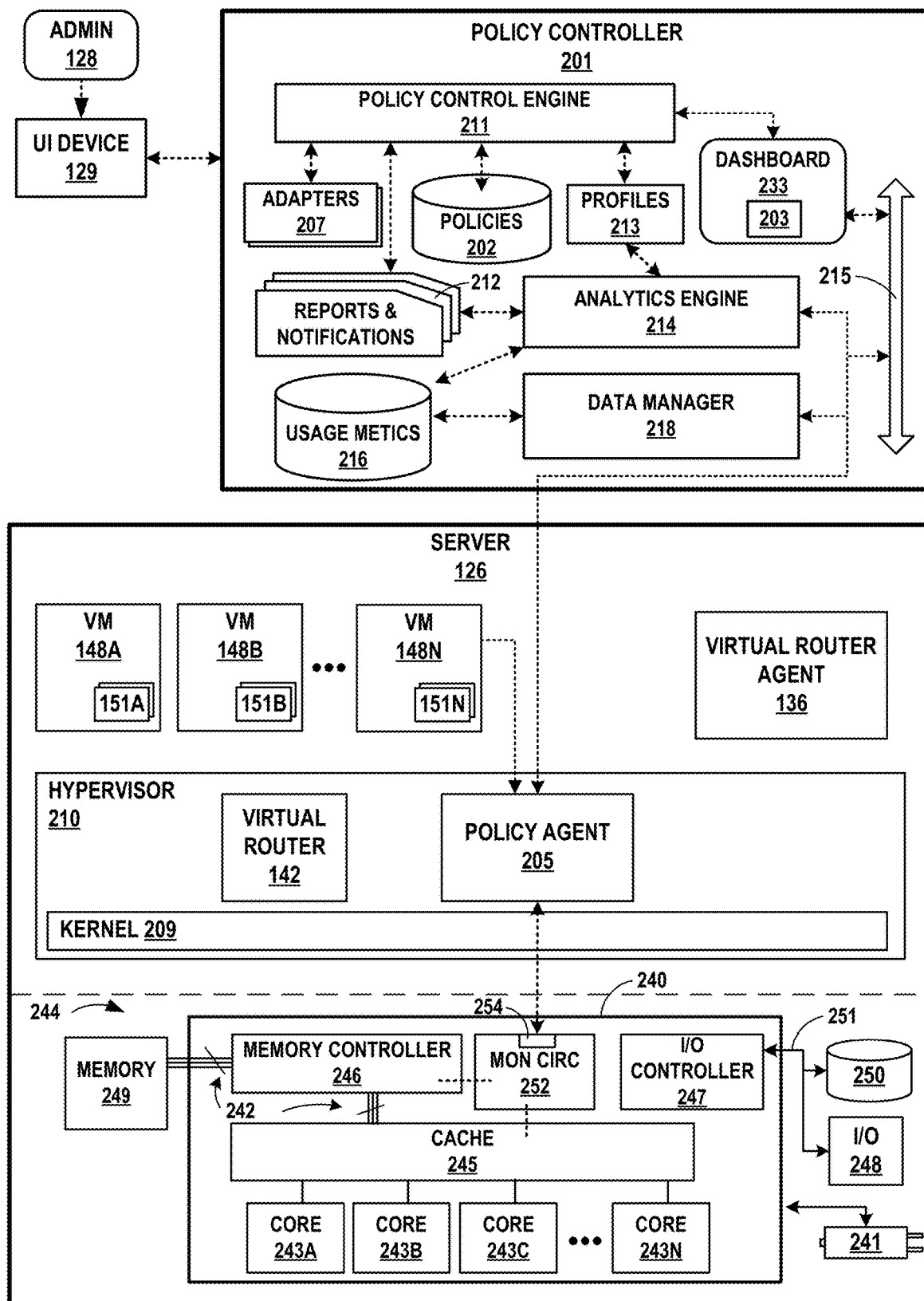
FIG. 2 is a block diagram illustrating a portion of the example data center of FIG. 1 in further detail, and in which internal processor metrics relating to resources shared by multiple processes executing on an example server are monitored, in accordance with one or more aspects of the present disclosure.

In general, and as further described herein in connection with FIG. 2, some of the techniques described herein make use of certain internal processor metrics relating to resources that are shared inside of a physical processor, such as metrics relating to an internal cache of the processor that is shared by software executing on one or more cores within the processor or memory bus bandwidth that is consumed by the cores within the physical processor. Such metrics relating to resources shared inside a physical microprocessor may provide insights as to how virtual machines 148 (or processes within virtual machines 148) executing on each of servers 126 are contending for or otherwise using shared resources internal to the processors. Such information may be used to pinpoint bottlenecks, instances of resource contention, and performance issues that might not otherwise be apparent from other metrics, such as CPU utilization or CPU load metrics. In some examples, the manner in which one or more virtual machines 148 operate and/or use such shared resources (such as a shared cache or memory bus) on a given server may adversely affect the operation of other virtual machines 148 on that same server. However, by monitoring only CPU usage, for example, it may be difficult to identify which particular virtual machine is causing performance problems for other virtual machines 148. Yet by monitoring metrics of resources internal to the processor of each of servers 126, it may be possible not only to identify which virtual machine may be causing performance problems for other virtual machines 148 on a given processor, but to also take steps to improve the policy control of all virtual machines 148 executing the processors of one or more servers 126. If appropriate policy control is applied across data center 110, it may be possible to improve the operation, efficiency, and consistent performance of data center 110 in the aggregate, and more effectively comply with service level agreements and performance guarantees.

By monitoring internal processor metrics to identify resources shared within the processor of a server as consumed by elements including software processes executing on hardware cores internal to the processor, policy controller 201 of data center 110 may identify virtual machines 148, containers, and/or processes that are consuming shared resources in manner that may adversely affect the performance of other virtual machines 148, containers, and/or processes executing on that server. By identifying processes that may be adversely affecting the operation of other processes, policy controller 201 of data center 110 may take steps to address how such processes operate or use shared resources, and as a result, improve the aggregate performance of virtual machines, containers, and/or processes executing on any given server, and/or improve the operation of all servers 126 collectively. Accordingly, as a result of identifying processes adversely affecting the operation of other processes and taking appropriate responsive actions, virtual machines 148 may perform computing operations on servers 126 more efficiently, and more efficiently use shared resources of servers 126. By performing computing operations more efficiently and more efficiently using shared resources of servers 126, data center 110 may perform computing tasks more quickly and with less latency. Therefore, aspects of this disclosure may improve the function of servers 126 and data center 110, because identifying and addressing any virtual machines 148 that are adversely affecting the operation of other virtual machines 148 may have the effect of enabling servers 126 and data center 110 to perform computing tasks more quickly and with less latency.

Further, assessment of metrics or conditions that may trigger an alarm may be implemented locally at each of servers 126 (e.g., by policy agents 205). By performing such assessments locally, performance metrics associated with the assessment can be accessed at a higher frequency, which can permit or otherwise facilitate performing the assessment faster. Implementing the assessment locally may, in some cases, avoid the transmission of information indicative of performance metrics associated with assessment to another computing device (e.g., policy controller 201) for analysis. As such, latency related to the transmission of such information can be mitigated or avoided entirely, which can result in substantial performance improvement in scenarios in which the number of performance metrics included in the assessment increases. In another example, the amount of information that is sent from the computing device can be significantly reduced when information indicative or otherwise representative of alarms and/or occurrence of an event is to be sent, as opposed to raw data obtained during the assessment of operational conditions. In yet another example, the time it takes to generate the alarm can be reduced in view of efficiency gains related to latency mitigation.

Various components, functional units, and/or modules illustrated in FIG. 1 (e.g., user interface device 129, orchestration engine 130, SDN controller 132, and policy controller 201, policy agent 205) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Alarms included in a profile 213, when triggered or 'active,' determine whether the profile 213 is active. In addition, alarms for groups of elements of which an element is a member may also determine whether the profile 213 for the element is active. Because an element may be a member of multiple groups that overlap at least with respect to the element, policy controller 201 that generates and in some cases distributes profiles 213 to policy agents 205 may allow users and administrators of virtualization infrastructure of data center 110 to express, with a profile 213, a combination of alarms to be applied to an element or group by configuring membership of the element or group in a another group, without having to manually configure an overall profile 213 for the element or the group. Further, the techniques may dynamically account for changes in a group membership by evaluating the profile 213 for the group using the new set of elements that are members of a group without having to reconfigure the profile 213 for the group.

Policy controller 201 may distribute profiles 213 to policy agents 205 executing on computing devices, e.g., server 126 or network devices of data center 110. A policy agent 205 evaluates each of the received profiles 213 based on the one or more alarms included therein and on metrics received by the policy agent 205 indicating a performance of the element and, at least in some cases where the element is a member of a group, one or more other elements that are also members of the group.

In accordance with one or more aspects of the present disclosure, policy engine 201 may generate a map of the elements within data center 110. For instance, in the example of FIG. 1, policy engine 201 accesses information about data center 110. Alternatively, or in addition, policy engine 201 interacts with one or more of user interface device 129, orchestration engine 130, and servers 126 to collect information about data center 110. Policy engine 201 generates, based on the information about data center 110, a graph depicting connections and/or relationships between elements within data center 110. The graph may include or describe an arrangement of elements within data center 110. The elements may include virtual or physical network devices, physical hosts, and/or instances (e.g., virtual machines and containers). In some examples, the graph may be considered a static graph, since it is based on information that changes relatively infrequently.

Policy engine 201 may generate an alert dependency graph. For instance, in the example of FIG. 1, policy engine 201 monitors, over a period of time, alarms (also referred to herein as alerts) generated by one or more policy agents 205. Policy engine 201 stores the alerts for later analysis. Policy engine 201 continues to monitor alerts generated by one or more policy agents 205, and identifies a current set of alerts. Policy engine 201 analyzes the current set of alerts and generates an alert dependency graph using the current set of alerts as nodes within the graph. Policy engine 201 determines how the nodes within the graph are interconnected based on the graph of elements. Policy engine 201 also determines weights for connections (i.e., "edges") between the nodes in the alert dependency graph. Policy engine 201 determines the weights based on an analysis of the stored historical alerts collected over a period of time.

Policy engine 201 may, based on the graph of the elements and the alert dependency graph, identify one or more root cause alerts. For instance, in the example of FIG. 1, policy engine 201 determines, based on the weights of the edges between the nodes in the alert dependency graph, an impact score for each of the nodes. Policy engine 201 identifies, based on the impact scores, a subset of nodes within the dependency graph that correspond to root cause alerts. In some examples, the subset of nodes may include only a small subset of the nodes and may thereby identify a small subset of alerts from among a large set of active alerts.

Through techniques in accordance with one or more aspects of the present disclosure, such as analyzing occurrences of multiple alerts in a set of historical alerts to identify, from among a large number of active alerts, a smaller set of root cause alerts, policy engine 201 may identify a small subset of root cause alerts. This small subset of alerts may, if addressed, resolve some or all of the remaining alerts. Accordingly, by identifying the small set of root cause alerts, policy engine 201 may cause data center 110 to operate more reliably, because less time and work will be required to diagnose issues with data center 110, and data center 110 will therefore tend to be restored to proper operation more quickly. Therefore, aspects of this disclosure may improve the function of data center 110 at least because analyzing occurrences of multiple alerts in a set of historical alerts to identify, from among a large number of active alerts, a smaller set of root cause alerts may have the effect of causing data center 110 to operate more reliably.

By identifying a set of root cause alerts, policy engine 201 may also reduce the number of alerts generated for display or evaluation. By reducing the number of alerts generated for display or evaluation, policy engine 201 may cause less information to be communicated between modules within policy engine 201 and/or transmitted outside data center 110. By causing less information to be communicated and/or transmitted, policy engine 201 may thereby cause data center 110 to consume less electrical power. Therefore, aspects of this disclosure may improve the function of data center 110 because identifying a set of root cause alerts may have the effect of causing data center 110 to consume less electrical power.

FIG. 2 is a block diagram illustrating a portion of the example data center 110 of FIG. 1 in further detail, and in which internal processor metrics relating to resources shared by multiple processes executing on an example server 126 are monitored, in accordance with one or more aspects of the present disclosure. Illustrated in FIG. 2 are user interface device 129 (operated by administrator 128), policy controller 201, and server 126.

Policy controller 201 may represent a collection of tools, systems, devices, and modules that perform operations in accordance with one or more aspects of the present disclosure. Policy controller 201 may perform cloud service optimization services, which may include advanced monitoring, scheduling, and performance management for software-defined infrastructure, where containers and virtual machines (VMs) can have life cycles much shorter than in traditional development environments. Policy controller 201 may leverage big-data analytics and machine learning in a distributed architecture (e.g., data center 110). Policy controller 201 may provide near or seemingly near real-time and historic monitoring, performance visibility and dynamic optimization. Policy controller 201 of FIG. 2 may be implemented in a manner consistent with the description of policy controller 201 provided in connection with FIG. 1. Policy controller 201 may execute dashboard module 233, which creates, maintains, and/or updates dashboard 203. Dashboard 203 may include user interfaces that may include hierarchical network or virtualization infrastructure heat maps. Infrastructure elements within such user interfaces may be presented with a color or a range indicator that identifies a value range into which one or more utilization metrics associated with each infrastructure element can be categorized.

In FIG. 2, policy controller 201 includes policies 202 and dashboard module 233, as illustrated in FIG. 1. Policies 202 and dashboard 203 may also be implemented in a manner consistent with the description of policies 202 and dashboard 203 provided in connection with FIG. 1. In FIG. 2, dashboard 203 is created, updated, and/or maintained primarily by a dashboard module 233 executing on controller 201. In some examples, as illustrated in FIG. 2, policies 202 may be implemented as a data store. In such an example, policies 202 may represent any suitable data structure or storage medium for storing policies 202 and/or information relating to policies 202. Policies 202 may be primarily maintained by policy control engine 211, and policies 202 may, in some examples, be implemented through a NoSQL database.

In the example of FIG. 2, policy controller 201 of FIG. 2 further includes policy control engine 211, adapter 207, message bus 215, reports and notifications 212, analytics engine 214, usage metrics data store 216, and data manager 218.

Policy control engine 211 may be configured to control interaction between one or more components of policy controller 201, in accordance with one or more aspects of the present disclosure. For example, policy control engine 211 may administer policies 202 and control adapters 207. Policy control engine 211 may also cause analytics engine 214 to generate reports and notifications 212 based on data from usage metrics data store 216, and may deliver one or more reports and notifications 212 to user interface device 129 and/or other systems or components of data center 110.

In one example, policy control engine 211 invokes one or more adapters 207 to discover platform-specific resources and interact with platform-specific resources and/or other cloud computing platforms. For instance, one or more adapters 207 may include an OpenStack adapter configured to communicate with an OpenStack cloud operating system operating on servers 126. One or more adapters 207 may include a Kubernetes adapter configured to communicate with a Kubernetes platform on servers 126. Adapters 207 may further include an Amazon Web Services adapter, Microsoft Azure adapter, and/or a Google Compute Engine adapter. Such adapters may enable policy controller 201 to learn and map the infrastructure utilized by servers 126. Policy controller 201 may use multiple adapters 207 at the same time.

Reports and notifications 212 may be created, maintained, and/or updated via one or more components of policy controller 201. In some examples, reports and notifications 212 may include information presented within dashboard 203, and may include information illustrating how infrastructure resources are consumed by instances over time. Notifications may be based on alarms, as further described below, and notifications may be presented through dashboard module 233, dashboard 203 or through other means.

One or more reports may be generated for a specified time period, organized by different scopes: project, host or department. In some examples, such a report may show the resource utilization by each instance that is in a project or scheduled on a host. Dashboard 203 may include information presenting a report in both graphical or tabular formats. Dashboard 203 may further enable report data to be downloaded as an HTML-formatted report, a raw comma-separated value (CSV) file, or an JSON-formatted data for further analysis.

Reports and notifications 212 may include a variety of reports, including a project report, a host report, and/or a department report, each of which may be included within dashboard 203. A project report may be generated for a single project or for all projects (provided administrator 128 is authorized to access the project or all projects). A project report may show resource allocations, actual usage, and charges. Resource allocations may include static allocations of resources, such as vCPUs, floating IP addresses, and storage volumes. Actual resource usage may be displayed within dashboard 203 for each instance in the project, and as the aggregate sum of usage by all instances in the project. Resource usage may show the actual physical resources consumed by an instance, such as CPU usage percentage, memory usage percentage, network I/O, and disk I/O. The cost charged for resource usage may be shown for each instance in the project. In addition, a cost breakdown by flavor type, and by resource type (Compute, Network, Storage) may be shown for the project as a whole.

As one example, policy control engine 211 may direct analytics engine 214 to generate a host report for all hosts or the set of hosts in a host aggregate, such as a cloud computing environment. In some examples, only users with an administrator role may generate a host report. A host report may show the aggregate resource usage of a host, and a breakdown of resource usage by each instance scheduled on a host. A host report may also show the cost charged for each instance on a host, as well as the total cost and total cost per flavor type. This provides an indication of the revenue generated by a host.

As another example, a department report shows total cost charged to a department. In some examples, administrator 128 may divide project costs among multiple departments, and a project may host applications and services that are used by multiple Departments. In such an example, each department may be wholly or partially responsible for the costs associated with one or more projects. Dashboard module 233 and/or dashboard 203 may provide support for dividing project costs among multiple departments through a department report presented in dashboard 203.

In some examples, policy controller 201 may configure an alarm, and may generate an alarm notification when a condition is met by one or more servers 126 and/or one or virtual machines 148 (or containers) executing on one or more servers 126. Policy agent 205 may monitor metrics at servers 126 and virtual machines 148, and analyze the raw data corresponding to the metrics for conditions of alarms that apply to those servers 126 and/or virtual machines 148, and/or instances running on each such servers 126 and/or virtual machines 148. In some examples, alarms may apply to a specified "scope" that identifies the type of element to monitor for a condition. Such elements may be a "host," "instance," or "service," for example. An alarm may apply to one or more of such elements. For instance, an alarm may apply to all hosts within data center 110, or to all hosts within a specified host aggregate (i.e. clusters of servers 126 or virtual machines 148, groups or pools of hypervisor hosts).

Policy agent 205 may continuously collect measurements of metrics for a host, e.g., a particular VM 148 of server 126, and its instances. For a particular alarm, policy agent 205 may aggregate samples according to a user-specified function (average, standard deviation, min, max, sum) and produce a single measurement for each user-specified interval. Policy agent 205 may compare each same and/or measurement to a threshold. In some examples, a threshold evaluated by an alarm or a policy that includes conditions for an alarm may be either a static threshold or a dynamic threshold. For a static threshold, policy agent 205 may compare metrics or raw data corresponding to metrics to a fixed value. For instance, policy agent 205 may compare metrics to a fixed value using a user-specified comparison function (above, below, equal). For a dynamic threshold, policy agent 205 may compare metrics or raw data correspond to metrics to a historical trend value or historical baseline for a set of resources. For instance, policy agent 205 may compare metrics or other measurements with a value learned by policy agent 205 over time.

In some example implementations, policy controller 201 is configured to apply dynamic thresholds, which enable outlier detection in resource consumption based on historical trends. For example, resource consumption may vary significantly at various hours of the day and days of the week. This may make it difficult to set a static threshold for a metric. For example, 70% CPU usage may be considered normal for Monday mornings between 10:00 AM and 12:00 PM, but the same amount of CPU usage may be considered abnormally high for Saturday nights between 9:00 PM and 10:00 PM. With dynamic thresholds, policy agent 205 may learn trends in metrics across all resources in scope to which an alarm applies. For example, if an alarm is configured for a host aggregate, policy agent 205 may learn a baseline from metric values collected for hosts in that aggregate. Similarly, policy agent 205 may, for an alarm with a dynamic threshold configured for a project, learn a baseline from metric values collected for instances in that project. Then, policy agent 205 may generate an alarm when a measurement deviates from the baseline value learned for a particular time period. Alarms having a dynamic threshold may be configured by metric, period of time over which to establish a baseline, and sensitivity. Policy agent 205 may apply the sensitivity setting to measurements that deviate from a baseline, and may be configured as "high," "medium," or "low" sensitivity. An alarm configured with "high" sensitivity may result in policy agent 205 reporting to policy controller 201 smaller deviations from a baseline value than an alarm configured with "low" sensitivity.

In some example implementations, an alarm may be characterized by its mode, such as an "alert mode," or an "event mode." When an alarm is configured as an alert, policy agent 205 may send a notification to policy controller 201 or otherwise notify policy controller 201 and/or other components of data center 110 whenever the state of the alert changes. In some examples, such an alert may initially be in a "learning" state until policy agent 205 has collected enough data to evaluate the conditions of the alert. An alert may be "active" when conditions of the alarm are met, and "inactive" when the conditions are not met.

When an alarm is configured as an event, policy agent 205 may send a notification to policy controller 201 or otherwise notify policy controller 201 (and/or other components of data center 110) for each interval in which the conditions of the alarm are met. As an example, consider an alarm for average CPU usage above 90% over an interval of 60 seconds. If the alarm mode is 'alert', then policy agent 205 may send a notification to policy controller 201 when the alarm becomes 'active' at time T1. When the CPU drops below 90% at time T5, policy agent 205 may send a notification that the alert is 'inactive'. If the same alarm is configured in 'event' mode, then policy agent 205 may send a notification to policy controller 201 for each of the five intervals in which the CPU load exceeds 90%.

In some examples, each alarm may be included within policies 202 maintained by policy controller 201 and apply to certain resources within data center 110. An alarm may, in response to input from a user or in response to other settings, apply to a particular scope: "host," "instance," and "service." Further, for a particular scope type, an alarm may apply to a subset of the resources of that scope type. When the scope of an alarm is configured as "host," for example, an alarm may apply to all hosts or hosts that belong to a specified host aggregate. When the scope of an alarm is configured as "instance," the alarm may be configured for and apply to one or more specific projects. Policy controller 201 may automatically configure an alarm for any new resource that matches the scope. For example, policy controller 201 may configure an alarm with "instance" scope for a given project (e.g., performed by one or more virtual machines 148) in response to user input. Thereafter, when one or more servers 126 creates an instance in that project, policy controller 201 may configure the alarm for the new instance.

Accordingly, in some examples, basic configuration settings for an alarm may include a name that identifies the alarm, a scope (type of resource to which an alarm applies: "host" or "instance"), an aggregate (a set of resources to which the alarm applies), a mode ("alert" or "event"), a metric (e.g., the metric that will be monitored by policy agents 205), an aggregation function (e.g., how policy agents 205 may combine samples during each measurement interval—examples include average, maximum, minimum, sum, and standard deviation functions), a comparison function (e.g., how to compare a measurement to the threshold, such as whether a measurement is above, below, or equal to a threshold), a threshold (the value to which a metric measurement is compared), a unit type (determined by the metric type), and an interval (duration of the measurement interval in seconds or other unit of time).

An alarm may define a policy that applies to a set of elements that are monitored, such as virtual machines in a project. A notification is generated when the condition of an alarm is observed for a given element. A user may configure an alarm to post notifications to an external HTTP endpoint. Policy controller 201 and/or policy agent 205 may POST a JSON payload to the endpoint for each notification. The schema of the payload may be represented by the following, where "string" and 0 are generic placeholders to indicate type of value; string and number, respectively:

{
  "apiVersion": "v1",
  "kind": "Alarm",
  "spec": {
    "name": "string",
    "eventRuleId": "string",
    "severity": "string",
    "metricType": "string",
    "mode": "string",
    "module": "string",
    "aggregationFunction": "string",
    "comparisonFunction": "string",
    "threshold": 0,
    "intervalDuration": 0,
    "intervalCount": 0,
    "intervalsWithException": 0,
  },

```
"status": {
  "timestamp": 0,
  "state": "string",
  "elementType": "string",
  "elementId": "string",
  "elementDetails": { }
 )
}
```

In some examples, the "spec" object describes the alarm configuration for which this notification is generated. In some examples, the "status" object describes the temporal event information for this particular notification, such as the time when the condition was observed and the element on which the condition was observed.

The schema represented above may have the following values for each field:
severity: "critical", "error", "warning", "information", "none"
metricType: refer to Metrics.
mode: "alert", "event"
module: the Analytics modules that generated the alarm. One of "alarms", "health/risk", "service alarms".
state: state of the alarm. For "alert" mode alarms, valid values are "active", "inactive", "learning". For "event" mode alarms, the state is always "triggered".
threshold: units of threshold correspond to metricType.
elementType: type of the entity or element. One of "instance", "host", "service".
elementId: UUID of the entity or element.
elementDetails: supplemental details about an entity or element. The contents of this object depend on the elementType. For a "host" or "service", the object is empty. For an "instance", the object will contain hostId and projectId.

```
{
  "elementDetails": {
    "hostId": "uuid",
    "projectId": "uuid"
  )
}
```

Analytics engine 214 may perform analysis, machine learning, and other functions on or relating to data stored within usage metrics data store 216. Analytics engine 214 may further generate reports, notifications, and alarms based on such information. For instance, analytics engine 214 may analyze information stored in usage metrics data store 216 and identify, based on information about internal processor metrics, one or more virtual machines 148 that are operating in a manner that may adversely affect the operation of other virtual machines 148 executing on server 126. Analytics engine 214 may, in response to identifying one or more virtual machines 148 operating in a manner that may adversely affect the operation of other virtual machines 148, generate one or more reports and notifications 212. Analytics engine 214 may alternatively, or in addition, raise an alarm and/or cause or instruct policy agent 205 to take actions to address the operation of the identified virtual machines 148. Analytics engine 214 may also analyze the metrics for one or more virtual machines 148, and based on this analysis, characterize one or more of virtual machines 148 in terms of the shared resources each of virtual machines 148 tends to consume. For instance, analytics engine 214 may characterize one or more virtual machines 148 as CPU bound, memory bound, or cache bound.

Usage metrics data store 216 may represent any suitable data structure or storage medium for storing information related to metrics collected by policy agents 205. For instance, usage metrics data store 216 may be implemented using a NoSQL database. The information stored in usage metrics data store 216 may be searchable and/or categorized such that analytics engine 214, data manager 218, or another component or module of policy controller 201 may provide an input requesting information from usage metrics data store 216, and in response to the input, receive information stored within usage metrics data store 216. Usage metrics data store 216 may be primarily maintained by data manager 218.

In some examples, a "metric" is a measured value for a resource in the infrastructure. Policy agent 205 may collect and calculate metrics for resources utilized by hosts and instances. Metrics may be organized into hierarchical categories based on the type of metric. Some metrics are percentages of total capacity. In such cases, the category of the metric determines the total capacity by which the percentage is computed. For instance, host.cpu.usage indicates the percentage of CPU consumed relative to the total CPU available on a host. In contrast, instance.cpu.usage is the percentage of CPU consumed relative to the total CPU available to an instance. As an example, consider an instance that is using 50% of one core on a host with 20 cores. The instance's host.cpu.usage will be 2.5%. If the instance has been allocated 2 cores, then its instance.cpu.usage will be 25%.

An alarm may be configured for any metric. Many metrics may also be displayed in user interfaces within dashboard 203, in, for example, a chart-based form. When an alarm triggers for a metric, the alarm may be plotted on a chart at the time of the event. In this way, metrics that might not be plotted directly as a chart may still visually correlated in time with other metrics. In the following examples, a host may use one or more resources, e.g., CPU ("cpu") and network ("network"), that each have one or more associated metrics, e.g., memory bandwidth ("mem_bw") and usage ("usage"). Similarly, an instance may use one or more resources, e.g., virtual CPU ("cpu") and network ("network"), that each have one or more associated metrics, e.g., memory bandwidth ("mem_bw") and usage ("usage"). An instance may itself be a resource of a host or an instance aggregate, a host may itself be a resource of a host aggregate, and so forth.

In some examples, raw metrics available for hosts may include:
host.cpu.io_wait
host.cpu.ipc
host.cpu.l3_cache.miss
host.cpu.l3_cache.usage
host.cpu.mem_bw.local
host.cpu.mem_bw.remote**
host.cpu.mem_bw.total**
host.cpu.usage
host.disk.io.read
host.disk.io.write
host.disk.response_time
host.disk.read_response_time
host.disk.write_response_time
host.disk.smart.hdd.command_timeout
host.disk.smart.hdd.current_pending_sector_count
host.disk.smart.hdd.offline_uncorrectable
host.disk.smart.hdd.reallocated_sector_count
host.disk.smart.hdd.reported_uncorrectable_errors
host.disk.smart.ssd.available_reserved_space
host.disk.smart.ssd.media_wearout_indicator
host.disk.smart.ssd.reallocated_sector_count
host.disk.smart.ssd.wear_leveling_count host.disk.usage.bytes
host.disk.usage.percent
host.memory.usage
host.memory.swap.usage
host.memory.dirty.rate
host.memory.page fault.rate
host.memory.page in out.rate
host.network.egress.bit_rate
host.network.egress.drops
host.network.egress.errors
host.network.egress.packet_rate
host.network.ingress.bit_rate
host.network.ingress.drops
host.network.ingress.errors
host.network.ingress.packet_rate
host.network.ipv4Tables.rule_count
host.network.ipv6Tables.rule_count
openstack.host.disk_allocated
openstack.host.memory_allocated
openstack.host.vcpus_allocated.

In some examples, calculated metrics available for hosts include:
host.cpu.normalized_load_1M
host.cpu.normalized_load_5M
host.cpu.normalized_load_15M
host.cpu.temperature
host.disk.smart.predict_failure
host. heartbeat.

For example, host.cpu.normalized_load is a normalized_load value that may be calculated as a ratio of the number of running and ready-to-run threads to the number of CPU cores. This family of metrics may indicate the level of demand for CPU. If the value exceeds 1, then more threads are ready to run than exists CPU cores to perform the execution. Normalized load may be a provided as an average over 1-minute, 5-minute, and 15-minute intervals.

The metric host.cpu.temperature is a CPU temperature value that may be derived from multiple temperature sensors in the processor(s) and chassis. This temperature provides a general indicator of temperature in degrees Celsius inside a physical host.

The metric host.disk.smart.predict_failure is a value that one or more policy agents 205 may calculate using multiple S.M.A.R.T. counters provided by disk hardware. Policy agent 205 may set predict_failure to true (value=1) when it determines from a combination of S.M.A.R.T. counters that a disk is likely to fail. An alarm triggered for this metric may contain the disk identifier in the metadata.

The metric host.heartbeat is a value that may indicate if policy agent 205 is functioning on a host. policy controller 201 may periodically check the status of each host by making a status request to each of policy agents 205. The host.heartbeat metric is incremented for each successful response. Alarms may be configured to detect missed heartbeats over a given interval.

In some examples, the following raw metrics may be available for instances:
instance.cpu.usage
instance.cpu.ipc
instance.cpu.l3_cache.miss
instance.cpu.l3_cache.usage
instance.cpu.mem_bw.local
instance.cpu.mem_bw.remote
instance.cpu.mem_bw.total
instance.disk.io.read
instance.disk.io.write
instance.disk.usage
instance.disk.usage.gb
instance.memory.usage
instance.network.egress.bit_rate
instance.network.egress.drops
instance.network.egress.errors
instance.network.egress.packet_rate
instance.network.egress.total_bytes
instance.network.egress.total_packets
instance.network.ingress.bit_rate
instance.network.ingress.drops
instance.network.ingress.errors
instance.network.ingress.packet_rate
instance.network.ingress.total_bytes
instance.network.ingress.total_packets.

In some examples, the following calculated metrics may be available for instances:
instance.heartbeat.

In some examples, the following raw metrics may be available for virtual router 142:
host.contrail.vrouter.aged_flows
host.contrail.vrouter.total_flows
host.contrail.vrouter.exception_packets
host.contrail.vrouter.drop_stats_flow_queue_limit_exceeded
host.contrail.vrouter.drop_stats_flow_table_full
host.contrail.vrouter.drop_stats_vlan_fwd_enq
host.contrail.vrouter.drop_stats_vlan_fwd_tx
host.contrail.vrouter.flow_export_drops
host.contrail.vrouter.flow_export_sampling_drops
host.contrail.vrouter.flow_rate_active_flows
host.contrail.vrouter.flow_rate_added_flows
host.contrail.vrouter.flow_rate_deleted_flows.

In some examples, the following raw metrics may be available within in a OpenStack Project Chart View included within dashboard 203:
openstack.project.active_instances
openstack.project.vcpus_allocated
openstack.project.volume_storage_allocated
openstack.project.memory_allocated
openstack.project.floating_ip_count
openstack.project.security_group_count
openstack.project.volume_count.

In some examples, the following raw metrics may be available in a Kubernetes Pod Chart View included within dashboard 203: pod.memory_allocated, pod.vcpus_allocated.

Data manager 218 and message bus 215 provide a messaging mechanism for communicating with policy agents 205 deployed in servers 126. Data manager 218 may, for example, issue messages to configure and program policy agent 205, and may manage metrics and other data received from policy agents 205, and store some or all of such data within usage metrics data store 216. Data manager 218 may communicate with policy engine 211 over message bus 215. Policy engine 211 may subscribe to information (e.g., metric information through a pub/sub messaging pattern) by interacting with data manager 218. In some cases, policy engine 211 subscribes to information by passing an identifier to data manager 218 and/or when making a call to an API exposed by data manager 218. In response, data manager 218 may place data on message bus 215 for consumption by data manager 218 and/or other components. Policy engine 211 may unsubscribe from receiving data from data manager over message bus 215 by interacting with data manager 218 (e.g., passing the identifier and/or making an API unsubscribe call).

Data manager 218 may receive, for example, raw metrics from one or more policy agents 205. Data manager 218 may, alternatively or in addition, receive results of analysis performed by policy agent 205 on raw metrics. Data manager 218 may, alternatively or in addition, receive information relating to patterns of usage of one or more input/output devices 248 that may be used to classify one or more input/output devices 248. Data manager 218 may store some or all of such information within usage metrics data store 216.

In the example of FIG. 2, server 126 represents a physical computing node that provides an execution environment for virtual hosts, such as VMs 148. That is, server 126 includes an underlying physical compute hardware 244 including one or more physical microprocessors 240, memory 249 such as DRAM, power source 241, one or more input/output devices 248, and one or more storage devices 250. As shown in FIG. 2, physical compute hardware 244 provides an environment of execution for hypervisor 210, which is a software and/or firmware layer that provides a light weight kernel 209 and operates to provide a virtualized operating environments for virtual machines 148, containers, and/or other types of virtual hosts. Server 126 may represent one of servers 126 (e.g., server 126A through server 126N) illustrated in FIG. 1

In the example shown, processor 240 is an integrated circuit having one or more internal processor cores 243 for executing instructions, one or more internal caches or cache devices 245, memory controller 246, and input/output controller 247. Although in the example of FIG. 2 server 126 is illustrated with only one processor 240, in other examples, server 126 may include multiple processors 240, each of which may include multiple processor cores.

One or more of the devices, modules, storage areas, or other components of server 126 may be interconnected to enable inter-component communications (physically, communicatively, and/or operatively). For instance, cores 243 may read and write data to/from memory 249 via memory controller 246, which provides a shared interface to memory bus 242. Input/output controller 247 may communicate with one or more input/output devices 248, and/or one or more storage devices 250 over input/output bus 251. In some examples, certain aspects of such connectivity may be provided through communication channels that include a system bus, a network connection, an inter-process communication data structure, or any other method for communicating data or control signals.

Within processor 240, each of processor cores 243A-243N (collectively "processor cores 243") provides an independent execution unit to perform instructions that conform to an instruction set architecture for the processor core. Server 126 may include any number of physical processors and any number of internal processor cores 243. Typically, each of processor cores 243 are combined as multi-core processors (or "many-core" processors) using a single IC (i.e., a chip multiprocessor).

In some instances, a physical address space for a computer-readable storage medium may be shared among one or more processor cores 243 (i.e., a shared memory). For example, processor cores 243 may be connected via memory bus 242 to one or more DRAM packages, modules, and/or chips (also not shown) that present a physical address space accessible by processor cores 243. While this physical address space may offer the lowest memory access time to processor cores 243 of any of portions of memory 249, at least some of the remaining portions of memory 249 may be directly accessible to processor cores 243.

Memory controller 246 may include hardware and/or firmware for enabling processor cores 243 to communicate with memory 249 over memory bus 242. In the example shown, memory controller 246 is an integrated memory controller, and may be physically implemented (e.g., as hardware) on processor 240. In other examples, however, memory controller 246 may be implemented separately or in a different manner, and might not be integrated into processor 240.

Input/output controller 247 may include hardware, software, and/or firmware for enabling processor cores 243 to communicate with and/or interact with one or more components connected to input/output bus 251. In the example shown, input/output controller 247 is an integrated input/output controller, and may be physically implemented (e.g., as hardware) on processor 240. In other examples, however, memory controller 246 may also be implemented separately and/or in a different manner, and might not be integrated into processor 240.

Cache 245 represents a memory resource internal to processor 240 that is shared among processor cores 243. In some examples, cache 245 may include a Level 1, Level 2, or Level 3 cache, or a combination thereof, and may offer the lowest-latency memory access of any of the storage media accessible by processor cores 243. In most examples described herein, however, cache 245 represents a Level 3 cache, which, unlike a Level 1 cache and/or Level2 cache, is often shared among multiple processor cores in a modern multi-core processor chip. However, in accordance with one or more aspects of the present disclosure, at least some of the techniques described herein may, in some examples, apply to other shared resources, including other shared memory spaces beyond the Level 3 cache.

Power source 241 provides power to one or more components of server 126. Power source 241 typically receives power from the primary alternative current (AC) power supply in a data center, building, or other location. Power source 241 may be shared among numerous servers 126 and/or other network devices or infrastructure systems within data center 110. Power source 241 may have intelligent power management or consumption capabilities, and such features may be controlled, accessed, or adjusted by one or more modules of server 126 and/or by one or more processor cores 243 to intelligently consume, allocate, supply, or otherwise manage power.

One or more storage devices 250 may represent computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor cores 243.

One or more input/output devices 248 may represent any input or output devices of server 126. In such examples, input/output devices 248 may generate, receive, and/or process input from any type of device capable of detecting input from a human or machine. For example, one or more input/output devices 248 may generate, receive, and/or process input in the form of physical, audio, image, and/or visual input (e.g., keyboard, microphone, camera). One or more input/output devices 248 may generate, present, and/or process output through any type of device capable of producing output. For example, one or more input/output devices 248 may generate, present, and/or process output in the form of tactile, audio, visual, and/or video output (e.g., haptic response, sound, flash of light, and/or images). Some devices may serve as input devices, some devices may serve as output devices, and some devices may serve as both input and output devices.

Memory 249 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 249 provides a physical address space composed of addressable memory locations. Memory 249 may in some examples present a non-uniform memory access (NUMA) architecture to processor cores 243. That is, processor cores 243 might not have equal memory access time to the various storage media that constitute memory 249. Processor cores 243 may be configured in some instances to use the portions of memory 249 that offer the lower memory latency for the cores to reduce overall memory latency.

Kernel 209 may be an operating system kernel that executes in kernel space and may include, for example, a Linux, Berkeley Software Distribution (BSD), or another Unix-variant kernel, or a Windows server operating system kernel, available from Microsoft Corp. In general, processor cores 243, storage devices (e.g., cache 245, memory 249, and/or storage device 250), and kernel 209 may store instructions and/or data and may provide an operating environment for execution of such instructions and/or modules of server 126. Such modules may be implemented as software, but may in some examples include any combination of hardware, firmware, and software. The combination of processor cores 243, storage devices within server 126 (e.g., cache 245, memory 249, and/or storage device 250), and kernel 209 may retrieve, store, and/or execute the instructions and/or data of one or more applications, modules, or software. Processor cores 243 and/or such storage devices may also be operably coupled to one or more other software and/or hardware components, including, but not limited to, one or more of the components of server 126 and/or one or more devices or systems illustrated as being connected to server 126.

Hypervisor 210 is an operating system-level component that executes on hardware platform 244 to create and runs one or more virtual machines 148. In the example of FIG. 2, hypervisor 210 may incorporate the functionality of kernel 209 (e.g., a "type 1 hypervisor"). In other examples, hypervisor 210 may execute on kernel 209 (e.g., a "type 2 hypervisor"). In some situations, hypervisor 210 may be referred to as a virtual machine manager (VMM). Example hypervisors include Kernel-based Virtual Machine (KVM) for the Linux kernel, Xen, ESXi available from VMware, Windows Hyper-V available from Microsoft, and other open-source and proprietary hypervisors.

In the example of FIG. 2, server 126 includes a virtual router 142 that executes within hypervisor 210, and may operate in a manner consistent with the description provided in connection with FIG. 1. In the example of FIG. 2, virtual router 142 may manage one or more virtual networks, each of which may provide a network environment for execution of virtual machines 148 on top of the virtualization platform provided by hypervisor 210. Each of the virtual machines 148 may be associated with one of the virtual networks.

Policy agent 205 may execute as part of hypervisor 210, or may execute within kernel space or as part of kernel 209. Policy agent 205 may monitor some or all of the performance metrics associated with server 126. According to the techniques described herein, among other metrics for server 126, policy agent 205 is configured to monitor metrics that relate to or describe usage of resources shared internal to processor 240 by each of processes 151 executing on processor cores 243 within multi-core processor 240 of server 126. In some examples, such internal processor metrics relate to usage of cache 245 (e.g., a L3 cache) or usage of bandwidth on memory bus 242. Policy agent 205 may also be capable of generating and maintaining a mapping that associates processor metrics for processes 151 to one or more virtual machines 148, such as by correlation with process identifiers (PIDs) or other information maintained by kernel 209. In other examples, policy agent 205 may be capable of assisting policy controller 201 in generating and maintaining such a mapping. Policy agent 205 may, at the direction of policy controller 201, enforce one or more policies 202 at server 126 responsive to usage metrics obtained for resources shared internal to a physical processor 240 and/or further based on other usage metrics for resources external to processor 240.

Virtual router agent 136 is included within server 126 in the example of FIG. 2. With reference to FIG. 1, virtual router agents 136 may be included within each of servers 126 (although not shown in FIG. 1). In the example of FIG. 2, virtual router agent 136 communicates with SDN controller 132 and, responsive thereto, directs virtual router 142 so as to control the overlay of virtual networks and coordinate the routing of data packets within server 126. In general, virtual router agent 136 communicates with SDN controller 132, which generates commands to control routing of packets through data center 110. Virtual router agent 136 may execute in user space and operate as a proxy for control plane messages between virtual machines 148 and SDN controller 132. For example, virtual machine 148A may request to send a message using its virtual address via virtual router agent 136, and virtual router agent 136A may in turn send the message and request that a response to the message be received for the virtual address of virtual machine 148A, which originated the first message. In some cases, virtual machine 148A may invoke a procedure or function call presented by an application programming interface of virtual router agent 136, and virtual router agent 136 handles encapsulation of the message as well, including addressing.

In some example implementations, server 126 may include an orchestration agent (not shown in FIG. 2) that communicates directly with orchestration engine 130. For example, responsive to instructions from orchestration engine 130, the orchestration agent communicates attributes of the particular virtual machines 148 executing on each of the respective servers 126, and may create or terminate individual virtual machines.

Virtual machine 148A, virtual machine 148B, through virtual machine 148N (collectively "virtual machines 148") may represent example instances of virtual machines 148. Server 126 may partition the virtual and/or physical address space provided by memory 249 and/or provided by storage device 250 into user space for running user processes. Server 126 may also partition virtual and/or physical address space provided by memory 249 and/or storage device 250 into kernel space, which is protected and may be inaccessible by user processes.

In general, each of virtual machines 148 may be any type of software application and each may be assigned a virtual address for use within a corresponding virtual network, where each of the virtual networks may be a different virtual subnet provided by virtual router 142. Each of virtual machines 148 may be assigned its own virtual layer three (L3) IP address, for example, for sending and receiving communications but is unaware of an IP address of the physical server on which the virtual machine is executing. In this way, a "virtual address" is an address for an application that differs from the logical address for the underlying, physical computer system, e.g., server 126A in the example of FIG. 1.

Each of virtual machines 148 may represent a tenant virtual machine running customer applications such as Web servers, database servers, enterprise applications, or hosting virtualized services used to create service chains. In some cases, any one or more of servers 126 (see FIG. 1) or another computing device hosts customer applications directly, i.e., not as virtual machines. Virtual machines as referenced herein (e.g., virtual machines 148), servers 126, or a separate computing device that hosts a customer application may be referred to alternatively as "hosts." Further, although one or more aspects of the present disclosure are described in terms of virtual machines or virtual hosts, techniques in accordance with one or more aspects of the present disclosure that are described herein with respect to such virtual machines or virtual hosts may also apply to containers, applications, processes, or other units of execution (virtualized or non-virtualized) executing on servers 126.

Processes 151A, processes 151B, through processes 151N (collectively "processes 151") may each execute within one or more virtual machines 148. For example, one or more processes 151A may correspond to virtual machine 148A, or may correspond to an application or a thread of an application executed within virtual machine 148A. Similarly, a different set of processes 151B may correspond to virtual machine 148B, or to an application or a thread of an application executed within virtual machine 148B. In some examples, each of processes 151 may be a thread of execution or other execution unit controlled and/or created by an application associated with one of virtual machines 148. Each of processes 151 may be associated with a process identifier that is used by processor cores 243 to identify each of processes 151 when reporting one or more metrics, such as internal processor metrics collected by policy agent 205.

In operation, hypervisor 210 of server 126 may create a number of processes that share resources of server 126. For example, hypervisor 210 may (e.g., at the direction of orchestration engine 130) instantiate or start one or more virtual machines 148 on server 126. Each of virtual machines 148 may execute one or more processes 151, and each of those software processes may execute on one or more processor cores 243 within hardware processor 240 of server 126. For instance, virtual machine 148A may execute processes 151A, virtual machine 148B may execute processes 151B, and virtual machines 148N may execute processes 151N. In the example of FIG. 2, processes 151A, processes 151B, and processes 151N (collectively "processes 151") all execute on the same physical host (e.g., server 126) and may share certain resources while executing on server 126. For instance, processes executing on processor cores 243 may share memory bus 242, memory 249, input/output devices 248, storage device 250, cache 245, memory controller 246, input/output controller 247, and/or other resources.

Kernel 209 (or a hypervisor 210 that implements kernel 209) may schedule processes to execute on processor cores 243. For example, kernel 209 may schedule, for execution on processor cores 243, processes 151 belonging to one or more virtual machines 148. One or more processes 151 may execute on one or more processor cores 243, and kernel 209 may periodically preempt one or more processes 151 to schedule another of the processes 151. Accordingly, kernel 209 may periodically perform a context switch to begin or resume execution of a different one of the processes 151. Kernel 209 may maintain a queue that it uses to identify the next process to schedule for execution, and kernel 209 may place the previous process back in the queue for later execution. In some examples, kernel 209 may schedule processes on a round-robin or other basis. When the next process in the queue begins executing, that next process has access to shared resources used by the previous processes, including, for example, cache 245, memory bus 242, and/or memory 249.

As described herein, the manner in which processes 151 within each of virtual machines 148 use a resource shared internally within a given physical processor 240 is often difficult to detect and manage, and therefore, may cause performance issues for processes 151 within a different one of virtual machines 148 that is similarly executing within the same physical processor. For example, a first process (e.g., one of processes 151A within virtual machine 148A) executing on processor core 243A may perform a memory operation that results in data from memory 249 being loaded into cache 245. Kernel 209 may, after that data has been loaded into cache 245, perform a context switch so that a second process (e.g., one of processes 151B) begins executing on processor core 243A (or another of processor cores 243). That second process (one of processes 151B within virtual machine 148B) may perform memory access operations that also cause data to be loaded into shared cache 245. If the second process performs operations that occupy or consume a significant amount of cache space, the data stored in the cache by the first process may be overwritten. After the data stored in the cache by the first process is overwritten by the second process, kernel 209 may eventually perform a context switch to resume execution of the first process (i.e., from processes 151A). That first process may attempt to access the same data that would otherwise be quickly available from cache 245, but since that data was cleared from cache 245 as a result of operations performed by the second process (i.e., from processes 151B), the first process will experience a page fault and/or a cache miss. Processor 240 will then re-retrieve the data from memory 249, but accessing the data from memory 249 is likely to be significantly slower than accessing the data from cache 245. Therefore, the performance of the first process may be adversely affected as a result of the cache-related operations performed by the second process. In other words, even when a given software application of a virtual machine is allocated an otherwise sufficient share of memory 249 and CPU time of processor 240 and/or a processor core 243 therein, utilization of cache 245 internal to processor 240 (and therefore not typically visible) by another software application can lead poor and unpredictable performance by both applications. As such, techniques are described herein by which policy agent 205 is configured to interrogate processor 240 to obtain metrics for resources, such as cache 245, that are shared internal to the processor and, therefore, would otherwise not be visible external to the processor. Moreover, the techniques leverage the internal processor metrics within the performance monitoring and policy enforcement mechanism provided by policy controller 201, thereby providing improved fine-grain control over the computing environment.

As another example, the manner in which one or more processes 151 within one of virtual machines 148 use other shared resources internal to processor 240 may also cause performance issues for other processes. For example, a first process (e.g., one of processes 151A within virtual machine 148A) executing on processor cores 243 may periodically read to and write from memory 249. A second process (e.g., one of processes 151B within virtual machine 148B) that also executes on processor cores 243 may also read and write from memory 249. As such, the first and second processes each consume a portion of the bandwidth available by memory bus 242 internal to processor 240. However, the second process may be a highly memory-intensive process that performs many operations involving memory bus 242. By performing many operations involving memory bus 242, the second process may consume so much of the bandwidth of memory bus 242 that the ability of the first process to read to and write from memory 249 may be adversely affected. Accordingly, as a result of operations of the second process involving shared memory bus 242, the performance of the first process may be adversely affected.

In the examples just described, the processes may be executing in different virtual machines or on the same virtual machine. However, situations arise where, regardless of policies designed to allocate fair amounts of utilization of memory 249 and processor 240 and/or cores 243, utilization of resources that are shared by the software processes internal to the processor 240 may affect, in some way, the performance of virtual machine 148A, and correspondingly, computing resources consumed by virtual machine 148A may affect, in some way, the performance of virtual machine 148B. In that sense, virtual machine 148A and virtual machine 148B must coexist on the same server 126, and therefore, must coexist in what might be considered the same "neighborhood." And further, where one of the virtual machines 148 consumes a significant amount of shared resources, particularly where that consumption affects other virtual machines 148, that resource-consuming process might be considered to be disrupting the neighborhood, and as a result, labeled a "noisy" neighbor.

When performance issues arise for one of virtual machines 148 executing on server 126, such issues may be the result of a noisy neighbor (e.g., a resource-intensive different virtual machine) on server 126. Yet some typical or common usage and/or performance metrics, such as CPU utilization or CPU load associated with processor cores 243, might not pinpoint or otherwise identify which virtual machine can be implicated as the noisy neighbor. In other words, where one of virtual machines 148 is consuming resources shared internal to processor 240 and in a way that affects other virtual machines 148, that consumption might not be reflected in a metric such as CPU utilization or CPU load. Accordingly, other resource metrics might be needed in order to identify and act on any virtual machines 148, containers, services, and/or processes 151 that may be consuming shared resources in a manner that is—or will be—affecting the performance of other virtual machines 148, containers, and/or processes 151.

In the example of FIG. 2, and in accordance with one or more aspects of the present disclosure, policy agent 205 monitors the operation of server 126 to identify virtual machines 148 that use shared resources internal to processor 240 of server 126 in such a way that may affect operation of other virtual machines 148. For example, policy agent 205 may monitor internal processor metrics that relate to or describe usage of cache 245 by each of processes 151 executing on processor cores 243 within server 126. Policy agent 205 may alternatively, or in addition, monitor internal processor metrics that relate to or describe consumption of memory bandwidth for memory bus 242 by each of processes 151 executing on processor cores 243 within server 126. Policy agent 205 may alternatively, or in addition, monitor internal processor metrics that relate to or describe use and/or consumption of other shared resources by each of processes 151 executing on processor cores 243 within server 126.

To access and monitor the internal processor metrics, policy agent 205 may interrogate processor 240 through a specialized hardware interface 254 that is exposed by APIs of kernel 209. For example, policy agent 205 may access or manipulate one or more hardware registers of processor cores 243 to program monitoring circuitry ("MON CIRC") 252 of processor 240 for internally monitoring shared resources and for reporting, via the interface, usage metrics for those resources. Policy agent 205 may access and manipulate the hardware interface of processor 240 by invoking kernel, operating system, and/or hypervisor calls. For example, the hardware interface of processor 240 may be memory mapped via kernel 209 such that the programmable registers of processor 240 for monitoring internal resources of the processor may be read and written by memory access instructions directed to particular memory addresses. In response to such direction by policy agent 205, monitoring circuitry 252 internal to processor 240 may monitor execution of processor cores 243, and communicate to policy agent 205 or otherwise make available to policy agent 205 information about internal processor metrics for each of the processes 151.

Policy agent 205 may maintain a mapping that associates processor metrics to each of processes 151 executing within virtual machines 148. For example, policy agent 205 may interrogate kernel 209 to identify process identifiers associated with each of the software processes executing on the virtual machines 148. Policy agent 205 may use the process identifiers for each of processes 151 associated with virtual machines 148 to correlate processor metrics reported by processor cores 243 for each of processes 151 with one of virtual machines 148. Policy agent 205 may use this information to extrapolate, from the processor metrics associated with each of processes 151, processor metrics associated with each of virtual machines 148. Policy agent 205 may use the extrapolated processor metrics associated with each of virtual machines 148 to identify how each of virtual machines 148 are using shared resources of servers 126. Policy agent 205 may evaluate the internal processor metrics and determine whether one or more virtual machines 148 are using shared resources in a manner that may adversely affect operation of other virtual machines 148.

Policy agent 205 may, in response to identifying one or more virtual machines 148 that are using shared resources in a manner that may adversely affect operation of other virtual machines 148, raise an alarm. For example, policy agent 205 may analyze internal processor metrics for virtual machine 148B, or one or more processes 151B executing within virtual machine 148B. Policy agent 205 may compare one or more metrics to an alarm threshold. The alarm threshold may be based on one or more policies 202 that policy agent 205 receives from policy controller 201 or that are otherwise expressed by policy controller 201 (or from one or more components of policy controller 201). Policy agent 205 may evaluate internal processor metrics for a number of intervals, and evaluate statistics for the processor metrics (e.g., average, maximum, standard deviation) in light of one or more policies 202. In some examples, policy agent 205 may evaluate internal processor metrics for virtual machine 148B over a period of time (e.g., five minutes) and/or over numerous intervals to determine a representative set of internal processor metrics for virtual machine 148B. Policy agent 205 may filter out any aberrations in the collected internal processor metrics that are not representative of the normal operation of virtual machine 148B and/or that are not likely to affect operation of virtual machines 148 that neighbor virtual machine 148B within server 126. Policy agent 205 may determine, based on such an evaluation, that the internal processor metrics for virtual machine 148B exceeds an alarm threshold expressed in one or more policies 202, or that the internal processor metrics associated with virtual machine 148B otherwise triggers an alarm.

Policy agent 205 may, in response to the alarm, take one or more actions to prevent detrimental effects on the performance of other virtual machines 148. For example, the alarm or the metrics on which the alarm is based may indicate that virtual machine 148B may be using cache 245 in such a way that may affect the performance of one or more other virtual machines 148. Policy agent 205 may act on such an alarm by restricting use of cache 245 by virtual machine 148B, by carving up cache 245 so that each of virtual machines 148 only has access to a portion of cache 245, by allocating a smaller portion to virtual machine 148B, by assigning overlapped or isolated cache lines to one or more virtual machines 148 or processes 151, or by otherwise restricting use of cache 245 by virtual machine 148B executing within virtual machine 148B. In another example, the alarm or the metrics on which the alarm is based may indicate that virtual machine 148B may be consuming memory bandwidth to such an extent that it is affecting the performance of other virtual machines 148 that seek to use memory bandwidth. Policy agent 205 may act on such an alarm by restricting use of memory bandwidth by virtual machine 148B.

In some examples, policy agent 205 may restrict use of shared resources by one or more virtual machines by restricting use of shared resources used by one or more processes executing within a particular virtual machine. For instance, the alarm or the metrics on which an alarm is based may indicate that a particular identified process within virtual machine 148B is using a shared resource in such a way that may affect not only the performance of one or more other virtual machines 148, but also one or more other processes 151 executing within that same virtual machine 148B. Policy agent 205 may act on such an alarm by restricting use of one or more shared resources by the identified process within virtual machine 148B. Policy agent 205 may apply the restriction to only the identified process within virtual machine 148B, rather than to all processes within virtual machine 148B. In some examples, virtual machine 148B may itself instantiate one or more virtual machines within virtual machine 148B. If this "second level" virtual machine itself becomes "noisy," policy agent 205 may apply the restrictions to only the noisy virtual machine within virtual machine 148, and avoid restricting other processes within virtual machine 148B where such restrictions might not be warranted or necessary.

In some examples, policy agent 205 may, alternatively or in addition, report to policy controller 201 information about the internal processor metrics. For example, policy agent 205 may collect processor metrics from processor cores 243. Policy agent 205 may identify the virtual machines 148 that are associated with some or all of the collected processor metrics. Policy agent 205 may communicate to data manager 218 information about the collected processor metrics. Data manager 218 may store some or all of the received information in usage metrics data store 216.

Policy controller 201 may act on the information received from policy agent 205 about internal processor metrics. For example, analytics engine 214 may analyze information stored in usage metrics data store 216 and identify, based on information about internal processor metrics, identify one or more virtual machines 148 that are operating in a manner that may adversely affect the operation of other virtual machines 148 executing on server 126. Analytics engine 214 may, in response to identifying one or more virtual machines 148, generate one or more reports and notifications 212. Analytics engine 214 may alternatively, or in addition, cause or instruct policy agent 205 to take actions to address the operation of the identified virtual machines 148.

In some examples, policy agent 205 may, alternatively or in addition, report to policy controller 201 information derived from internal processor metrics of processor cores 243. In other words, rather than simply reporting internal processor metrics to policy controller 201, policy agent 205 may perform some analysis on the collected metrics, and report the results of such analysis to policy controller 201. For example, policy agent 205 may collect processor metrics and identify one or more virtual machines 148 that are operating in a manner that may adversely affect the operation of other virtual machines 148 executing on server 126. Policy agent 205 may communicate to data manager 218 information about the results of its analysis, which may identify one or more virtual machines 148 and/or the shared resources that may be involved. Analytics engine 214 may, in response to such information, instruct policy agent 205 to take action to address the operation of the identified virtual machines 148. Accordingly, the processing and/or analysis of various metrics, including internal processor metrics from processor cores 243, may be performed by policy agent 205, by policy controller 201 (e.g., analytics engine 214), by a combination of policy agent 205 and policy controller 201, or by another module or component of server 126.

In some examples, policy agent 205 and/or policy controller 201 may monitor internal processor metrics associated with processor cores 243 using Intel's Resource Directory Technology (RDT) available in some Intel® Xeon® processors as one example of monitoring circuitry 252 of processor 240. Intel's RDT enables resource monitoring and control features designed to improve visibility into and control over how shared platform resources are used. For instance, by using RDT's Cache Monitoring Technology (CMT) of monitoring circuitry 252, policy agent 205 may determine last level cache utilization of individual threads that are executing on server 126. Policy agent 205 and/or policy controller 201 may use this information to derive usage of cache 245 by one or more virtual machines 148 (or processes 151). In another example, policy agent 205 may use RDT's Memory Bandwidth Monitoring (MBM) of monitoring circuitry 252 to identify local memory bandwidth usage for individual threads executing within virtual machines 148 on server 126. In RDT, MBM is an extension of CMT which provides monitoring per thread for its remote and local memory bandwidth usage. In another example, policy agent 205 may use RDT's Cache Allocation Technology (CAT) of monitoring circuitry 252 to prioritize different virtual machines 148 or processes executing on server 126. Hypervisor 210, policy controller 201 and/or policy agent 205 may use CAT to carve out cache 245 to different virtual machines 148 executing on server 126. In another example, policy agent 205 may also use RDT's Code and Data Prioritization (CDP) to allocate code and data segments in cache 245.

To access information made available through RDT, policy agent 205 may access CPU identifier information and information of monitoring circuitry 252 as exposed by kernel 209 to verify if processor cores 243 implements some or all of the RDT capabilities. Policy agent 205 may interact with the Intel processor and the kernel running on the Intel processor. For instance, if processor cores 243 implements RDT or a similar technology, policy agent 205 may, by invoking the appropriate kernel APIs or function calls, configure a model specific register (MSR) and program a specific item identifier that corresponds to the desired internal processor metrics associated with processor cores 243. In response, processor cores 243 may periodically publish or write the requested internal processor metrics to the specified MSR. Policy agent 205 may thereafter collect internal processor metrics by reading from the specified MSR. In some examples, such as when hypervisor 210 implements or is implemented on top of a Linux kernel, the Linux kernel memory maps the internal processor metrics, and controls how policy agent 205 or other processes read and write from the specified MSRs. Policy agent 205 may invoke the appropriate Linux calls to direct processor cores 243 to monitor specific metrics, and policy agent 205 may read the appropriate MSRs in order to extract the desired internal processor metrics.

Policy controller 201 may establish one or more policies 202 indicating that when orchestration engine 130 directs hypervisor 210 to spin up, instantiate, or otherwise start a new virtual machine, hypervisor 210 will specify how the new virtual machine may use one or more shared resources. For example, policy control engine 211 of policy controller 201 may establish one or more policies 202 indicating that new virtual machines 148 are given an equal share of cache 245. Or that high priority virtual machines 148, containers, or processes 151 are given a larger share of cache 245. Policy control engine 211 may cause policy controller 201 to communicate one or more policies 202 to orchestration engine 130 (or to hypervisor 210) so that when orchestration engine 130 directs hypervisor 210 to create a new virtual machine, the new virtual machine is created with an equal share of cache 245. In another example, policy controller 201 may establish one or more policies 202 indicating that new virtual machines 148 are given a specific percentage share of cache 245. In such an example, policy control engine 211 may cause policy controller 201 to communicate one or more corresponding policies 202 to orchestration engine 130 and/or to hypervisor 210 so that when orchestration engine 130 directs hypervisor 210 to create a new virtual machine, the new virtual machine is created with a specific percentage share of cache 245. Orchestration engine 130 may implement such policies by carving up cache 245 using RDT's CAT functionality or similar functionality made available by other processors.

In such examples, policy agent 205 and/or policy controller 201 may still respond to alerts by further restricting use of cache 245 or other shared resource, and/or generate one or more reports and notifications 212. A REST interface may be used to dynamically update the allocation of cache 245 associated with virtual machines 148 and/or processes 151. For example:

curl-i\
   H 'Content-Type: application/json'\
   X PUT \
   d '{"InstanceCacheAllocationPercentage": 5}'\
   http://<host-ip-address>:7000/appformix/v1.0/instance_definition/<instanc e-id>

In the example above, parameters that can be set for the instance_definition include InstanceCacheAllocationMB, InstanceCacheAllocationPercentage, and InstanceCacheAllocationEqualShare. Policy controller 201 and/or policy agent 205 may provide isolated cache lines to virtual machines 148, to instances of virtual machines 148, or to applications. Alternatively, or in addition, policy controller 201 and/or policy agent 205 may allocate shared portions of cache 245 based on a priority class of the instance, classification of the instance, or based on application workload. In some examples, the cache may be allocated on a per-CPU socket basis (e.g., per processor 240 basis). Policy agent 205 may perform allocations based on usage, current scheduling pattern of the set of processes, and CPU core pinning attributes of the instance, the virtual machine, or the application.

Policy agent 205 and/or policy controller 201 may classify one or more virtual machines 148 based on the manner in which each virtual machine consumes shared resources. For example, policy agent 205 may monitor metrics, including internal processor metrics for each of virtual machines 148 over a period of time. Policy agent 205 may, for each of virtual machines 148, determine patterns of usage of cache 245, memory bandwidth usage, instructions retired per second, and other metrics associated with the operation of each of virtual machines 148. Policy agent 205 may communicate information about the patterns of usage to data manager 218 of policy controller 201. Data manager 218 may store the information in usage metrics data store 216. Analytics engine 214 of policy controller 201 may analyze the metrics for each of virtual machines 148, such as by performing a linear regression across each of the monitored metrics. Analytics engine 214 may, based on this analysis, characterize one or more of virtual machines 148 in terms of the shared resources each of virtual machines 148 tends to consume. For instance, analytics engine 214 may characterize one or more virtual machines 148 as CPU bound, memory bound, or cache bound.

Policy controller 201 may establish one or more policies 202 to limit the number of virtual machines 148 having the same or similar classifications on server 126. For example, policy control engine 211 of policy controller 201 may establish one or more policies 202 that are based on the classifications of virtual machines 148 described above. Such policies 202 may be designed to avoid having too many virtual machines 148 that are consuming shared resources of server 126 in similar ways. In one example, policy control engine 211 and/or analytics engine 214 may determine that if a given number of virtual machines 148 can be characterized as CPU bound, and orchestration engine 130 (or hypervisor 210) seeks to instantiate or start a new CPU bound virtual machine, one or more policies 202 may ensure that the new virtual machine is not instantiated or started on server 126, but rather, is instantiated or started on a different physical host within data center 110. Specifically, in such an example, policy control engine 211 may establish one or more policies 202 that limit the number of CPU bound virtual machines 148 to the number of cores associated with processor cores 243. If there are 16 cores within processor cores 243, policy control engine 211 may establish one or more policies 202 indicating that no more than 16

CPU bound virtual machines 148 should be executing on server 126. In a different example, if a given number of virtual machines 148 can be characterized as cache bound, and orchestration engine 130 seeks to instantiate or start a new cache bound virtual machine, one or more policies 202 may ensure that the new virtual machine is not instantiated or started on server 126, but rather, is instantiated or started on a different physical host within data center 110.

Policy controller 201 may cause orchestration engine 130 to choose or adjust, based on classifications of virtual machines 148, the physical host on which one or more virtual machines 148 are executing. For example, with reference to FIG. 1 and FIG. 2, policy control engine 211 of policy controller 201 may determine that 50 CPU bound virtual machines 148 and no memory bound virtual machines 148 are executing on server 126A. Policy control engine 211 may further determine that no CPU bound virtual machines 148 and 40 memory bound virtual machines 148 are executing on server 126B. Policy control engine 211 may determine that server 126A and server 126B may each perform better if some of the 50 CPU bound virtual machines 148 executing on server 126A were instead executing on server 126B, and some of the 40 memory bound virtual machines 148 executing on server 126B were instead executing on server 126A. Accordingly, policy control engine 211 may cause policy controller 201 to communicate with orchestration engine 130, instructing orchestration engine 130 to reallocate one or more virtual machines 148. For instance, policy controller 201 may instruct orchestration engine 130 to move some of the virtual machines 148 executing on server 126A to server 126B, and move some of the virtual machines 148 executing on server 126B to server 126A. Data center 110 may, as a result of allocating virtual machines 148 across servers 126 in this manner, exhibit improved performance.

Policy controller 201 may also establish policies to improve NUMA locality using memory bandwidth metrics (e.g., RDT's MBM metric). In such an example, policy agent 205 may collect from processor cores 243 metrics relating to unoptimized NUMA if remote memory bandwidth is greater than local memory bandwidth. Policy agent 205 may use such metrics to repurpose or reimplement one or more virtual machines 148 for NUMA locality. The latencies for accessing remote memory may be much higher than for local memory.

Analytics engine 214 evaluates alarms included in each of profiles 213 by comparing the alarm thresholds to usage metrics 216 for the corresponding resource using any of the aforementioned techniques for static or dynamic thresholding, immediate or historic usage data, for instance. Based on evaluating the multiple alarms within a profile 213 for an element by virtue of direct association with the element or indirect association with the element because the element is configured by policy control engine 211 as a member of a group associated with a profile that includes one or more alarms, analytics engine 214 sets the profile to active or inactive and may perform any of the aforementioned ameliorative, reporting, and or notification operations. In some examples, analytics engine 214 may distribute profiles 213 among policy agents 205 to evaluate alarms and profiles 213 in a distributed, local manner on servers 126.

Analytics engine 214 may determine a root cause alert from among a large number of alerts based on an analysis of historical alerts generated within data center 110. For instance, in an example that can be described in the context of FIG. 2, analytics engine 214 generates a map of elements within data center 110. Analytics engine 214 observes alerts on message bus 215 and stores the alerts as a set of historical alerts for later use. Analytics engine 214 generates an alert dependency graph using a current set of alerts observed on message bus 215 as nodes within the dependency graph. Analytics engine 214 uses both the map of the elements and the stored historical alerts to determine the structure and characteristics of the dependency graph. Analytics engine 214 uses the dependency graph to calculate an impact score for each of the current alerts. Analytics engine 214 uses the impact score to identify a current alert as the root cause of other alerts. Although aspects of this disclosure are described primarily in terms of "alerts," techniques in accordance with this disclosure may apply more broadly, such as to other types of alarms (e.g., "event mode" as described above) or notifications generally.

FIG. 3A, FIG. 3B, FIG. 3C, and FIG. 3D are conceptual diagrams illustrating an example procedure for identifying one of three alerts as being a root cause alert, in accordance with one or more aspects of the present disclosure. The example described in connection with FIG. 3A, FIG. 3B, FIG. 3C, and FIG. 3D is a simplified example for illustrative purposes, but corresponding techniques may be extended to scenarios in which a small subset of root cause alerts can be identified from a larger set of tens or hundreds of alerts. Aspects of the example of FIG. 3A, FIG. 3B, FIG. 3C, and FIG. 3D may be described in the context of FIG. 1 and FIG. 2.

In the example of FIG. 3A, and in accordance with one or more aspects of the present disclosure, analytics engine 214 of may generate element dependency graph 310. For instance, with reference to FIG. 1 and FIG. 2, analytics engine 214 of policy engine 201 interacts with policy control engine 211, adapters 207, and/or other components of policy engine 201 to collect information about data center 110. Analytics engine 214 determines, based on such interactions (or based on other stored information), that data center 110 includes one physical host (i.e., server 126 in FIG. 2 and FIG. 3A) and three virtual machines 148 (i.e., virtual machine 148A, virtual machine 148B, and virtual machine 148C). Element dependency graph 310 of FIG. 3A is a conceptual illustration of the infrastructure of data center 110 in the described example. Analytics engine 214 generates and/or maintains a data structure corresponding to element dependency graph 310.

Analytics engine 214 may observe alerts that are generated by one or more policy agents 205 in response to resource monitoring activities. For instance, referring again to of FIG. 2, policy agent 205 of server 126 monitors resources of server 126. In response to the monitoring, policy agent 205 generates alerts and places the alerts on message bus 215. Analytics engine 214 observes alerts on message bus 215, and stores information about the alerts in data manager 218. The stored information includes a time associated with each alert, and also information about the element and resource associated with the alert. In the example of FIG. 3B, analytics engine 214 observes two alerts during time bin 1: "(148A, net)" and "(148B, mem)" These are alerts relating to network resources ("net") and memory resources ("mem") associated with virtual machine elements ("148A" and "148B"). In other words, the first alert in time bin 1 relates to a network resource associated with virtual machine 148A, and may indicate a high network utilization, for example. The second alert in time bin 1 relates to the memory resource associated with virtual machine 148B, and may indicate a high memory utilization for virtual machine 148B. In general, policy agents 205 within data center 110 apply rules that have been defined to monitor various resources within data center 110 and capture information relating to performance and other issues for those resources. The rules may be applied to concurrent or identical time scales, so that the rules operated to detect performance issues for resources during concurrent, similar, corresponding, or identical time frames.

Analytics engine 214 may organize historical alerts into a series of time bins. For instance, continuing with the same example, analytics engine 214 continues to observe and/or monitor alerts on message bus 215, and store information about the alerts in data manager 218. Further, analytics engine 214 organizes each observed alert into one of a series of consecutive, rolling time bins. In FIG. 3B, alerts are shown categorized into ten historical time bins 321. Each reference to an alert in a given time bin indicates that at least one alert of the indicated type occurred within that time bin. For time bin 7, for example, the table illustrated in FIG. 3B indicates that analytics engine 214 observed two distinct alerts, each of which may have been repeated more than once. For time bin 8, for example, analytics engine 214 observed at least four alerts, but all of those alerts correspond to one of the four types listed for time bin 8. In some examples, the time bins correspond to consecutive time periods having lengths on the order of minutes (e.g., ten minutes), although shorter timeframes (sub-second or second) are possible and longer timeframes (e.g., hourly, daily) are possible. Further, although in the example of FIG. 3B only one alert of a particular type is included within each time bin, in other examples, multiple occurrences of the same alert might each be represented within one or more time bins.

Analytics engine 214 may identify a set of alerts collected in a current time bin. For instance, in the example of FIG. 3B, after collecting historical time bins 321 as illustrated in FIG. 3B, analytics engine 214 collects another set of alerts in a time bin labeled "current" (current time bin 322). In some examples, current time bin 322 may the next time bin following time bin 10 of historical time bins 321; in other examples, current time bin 322 may be a time bin occurring later in time. Further, in some examples, current time bin 322 may span the same length of time as the historical time bins (i.e., time bins 1 through 10); in other examples, current time bin 322 may be a different length time bin.

Analytics engine 214 may generate alert dependency graph 330. For instance, as illustrated in FIG. 3C, analytics engine 214 constructs alert dependency graph 330, using each of the three alerts in current time bin 322 as a node for alert dependency graph 330. In alert dependency graph 330, node A1 corresponds to the first of the three alerts in current time bin 322 ("126, cpu"); node A2 corresponds to the second of the three alerts in current time bin 322; and node A3 corresponds to the third of the three alerts in current time bin 322.

Analytics engine 214 may determine which of the nodes in alert dependency graph 330 are connected to each other. For instance, in the example of FIG. 3C, analytics engine 214 connects nodes in alert dependency graph 330 that either (1) share the same element (e.g., host instance, network switch, etc.), or (2) are associated with elements that are connected to each other in element dependency graph 310. In FIG. 3C, node 331 (A1) is associated with server 126, and node 332 (A2) is associated with virtual machine 148A. And since server 126 and virtual machine 148A are connected in element dependency graph 310, node 331 (A1) and node 332 (A2) are connected in alert dependency graph 330. Similarly, node 331 (A1) is associated with server 126, and node 333 (A3) is associated with virtual machine 148C. And since server 126 and virtual machine 148C are connected in element dependency graph 310, node 331 (A1) and node 333 (A3) are connected in alert dependency graph 330. However, node 332 (A2) is not connected to node 333 (A3) in alert dependency graph 330. That is because A2 is associated with virtual machine 148A, and A3 is associated with virtual machine 148C. Virtual machine 148A and virtual machine 148C do not share the same element (e.g., virtual machine 148A is not the same as virtual machine 148C). Also, virtual machine 148A and virtual machine 148C are not connected in element dependency graph 310. Therefore, in the described example, node 332 and node 333 (nodes A2 and A3) are not connected in FIG. 3C.

In other examples, analytics engine 214 connects only nodes in alert dependency graph 330 that both (1) share the same element, and (2) are associated with elements that are connected to each other in element dependency graph 310. Further, in some examples, alert dependency graph 330 may take the form of multiple graphs that are not connected to each other. In such an example, techniques in accordance with one or more aspects of the present disclosure may be applied to each such graph independently and/or separately. In general, an alert dependency graph captures correlations between the observed active alerts using historical alert data. Edges between any two nodes in the graph may represent a possible dependency between the alerts and the weight of the edge (described below) represents the degree of correlation between the alerts.

An alert dependency graph can be generated in a number of ways. For example, analytics engine 214 may generate a one-time alert dependency graph, or an on-demand alert dependency graph using historical alert data. If S is the set of active alerts, analytics engine 214 generates an alert dependency graph for each of the set of active alerts: S={A1, A2, A3}. For a one-time alert dependency graph, set S is the set of unique active alerts in N bins. For an on-demand alert dependency graph, set S is the set of active alerts in a given monitoring time bin.

Analytics engine 214 may calculate occurrence counts for each of the nodes in alert dependency graph 330. For instance, in the example being described in connection with FIG. 3A through FIG. 3D, analytics engine 214 calculates an occurrence count for each of node 331, node 332, and node 333. To calculate an occurrence count for node 331, analytics engine 214 identifies alerts in historical time bins 321 that match node 331 (i.e., alerts matching the signature "126, cpu"), and determines that 5 of historical time bins 321 have an alert matching node 331 (i.e., time bins 2, 4, 6, 7, and 9, as indicated by arrows in FIG. 3B). The occurrence count for node 331 is therefore 5 in the described example. Analytics engine 214 calculates an occurrence count for node 332 by determining that there are 4 time bins in historical time bins 321 that have an alert matching node 332 (i.e., time bins 1, 3, 4, and 8). Analytics engine 214 calculates an occurrence count for node 333 by determining that there are 3 time bins in historical time bins 321 that have an alert matching node 333 (i.e., time bins 2, 4, and 6). The occurrence counts for node 331, node 332, and node 333 are summarized in FIG. 3D.

Analytics engine 214 may calculate concurrent occurrence counts for each of the connections between pairs of nodes in alert dependency graph 330. For instance, in the example of FIG. 3C, analytics engine 214 calculates a concurrent occurrence count for node 331 and node 332 (connected in alert dependency graph 330), by identifying all time bins in which an alert corresponding to both node 331 and node 332 occur. In FIG. 3B, alerts corresponding to both node 331 (A1) and node 332 (A2) occur concurrently in only time bin 4 of historical time bins 321. Accordingly, analytics engine 214 determines that the concurrent occurrence count for node 331 and node 332 is 1. Analytics engine 214 also calculates a concurrent occurrence count for node 331 and node 333 (also connected in alert dependency graph 330). Analytics engine 214 identifies three time bins in historical time bins 321 in which an alert corresponding to both node 331 and node 333 occur. Specifically, analytics engine 214 determines that alerts corresponding to both node 331 and node 333 occur in time bins 2, 4, and 6, so the concurrent occurrence count for node 331 and node 333 is 3.

Analytics engine 214 may calculate weights for the connections or edges in alert dependency graph 330. For instance, in the example of FIG. 3A through FIG. 3D, analytics engine 214 calculates a weight for edge 335 ($W_{12}$) by dividing the concurrent occurrence count for the nodes connected by edge 335 (node 331 to node 332) by the occurrence count for the starting node (node 331):

Weight$_{12}$=(Concurrent Occurrence Count for A1 and A2)÷(Occurrence Count for A1)=1/5=0.2

Analytics engine 214 calculates a weight for edge 336 ($W_{21}$) by dividing the concurrent occurrence count for the nodes connected by edge 336 (node 332 to node 331) by the occurrence count for the starting node (node 332):

Weight$_{21}$=(Concurrent Occurrence Count for A1 and A2)÷(Occurrence Count for A2)=1/4=0.25

Analytics engine 214 calculates a weight for edge 337 ($W_{31}$) by dividing the concurrent occurrence count for the nodes connected by edge 337 (node 333 to node 331) by the occurrence count for the starting node (node 333):

Weight$_{31}$=(Concurrent Occurrence Count for A1 and A3)÷(Occurrence Count for A3)=3/3=1.0

Analytics engine 214 calculates a weight for edge 338 ($W_{13}$) by dividing the concurrent occurrence count for the nodes connected by edge 338 (node 331 to node 333) by the occurrence count for the starting node (node 331):

Weight$_{13}$=(Concurrent Occurrence Count for A1 and A3)÷(Occurrence Count for A1)=3/5=0.6

The weights for each of the four edges are summarized in FIG. 3D.

Analytics engine 214 may use the calculated weights to determine an impact score for each node in alert dependency graph 330. For instance, in the example of FIG. 3C, analytics engine 214 determines that the impact score for node 331 is a combination (e.g., sum or geometric sum) of the weights of the edges originating from node 331. Specifically, analytics engine 214 determines the impact score for node 331 by adding the weights for edge 335 and edge 338:

$IS(A1)=W_{12}+W_{13}=0.6+0.2=0.8$

Analytics engine 214 determines the impact score for node 332 by adding the weights for the edges originating from node 332, which is only edge 336:

$IS(A2)=W_{21}=0.25$

Analytics engine 214 determines the impact score for node 333 by adding the weights for the edges originating from node 333, which is only edge 337:

$IS(A3)=W_{31}=1.0$

Analytics engine 214 may use the impact scores to identify a root cause alert from among the set of all current alerts. For instance, in the example of FIG. 3A through FIG. 3D, analytics engine 214 compares the impact scores for each of node 331, node 332, and node 333. Analytics engine 214 determines that node 333 (A3) has the highest impact score. Accordingly, analytics engine 214 identifies node 333 as a root cause alert in the described example. Analytics engine 214 may output information about node 333 on message bus 215 for consumption by other modules of policy engine 201. In some examples, dashboard module 233 may subscribe to or observe one or more root cause alerts, and update a user interface to highlight the one or more root cause alerts.

Figure 4A:
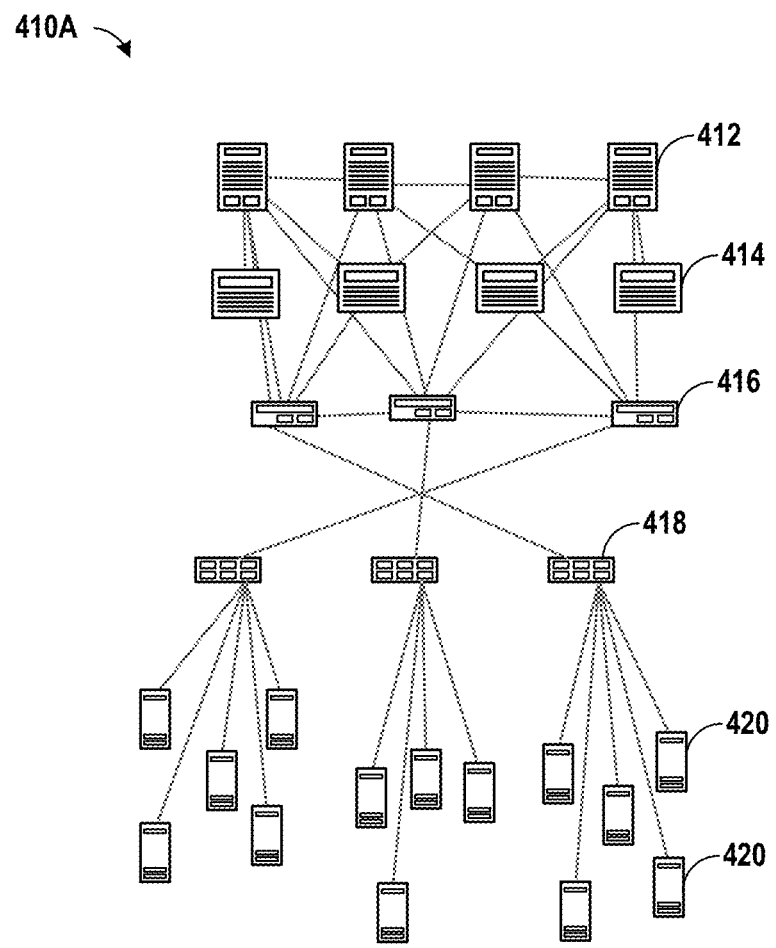
FIG. 4A and FIG. 4B are conceptual diagrams illustrating additional example element dependency graphs, in accordance with one or more aspects of the present disclosure.
Figure 4B:
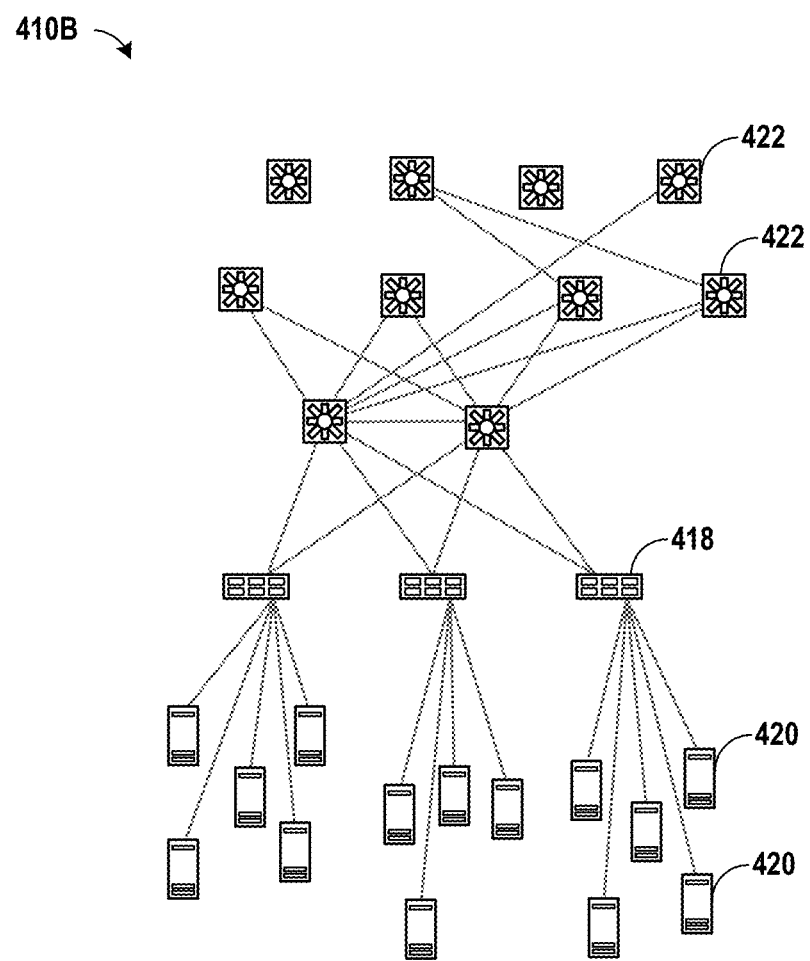

FIG. 4A and FIG. 4B are conceptual diagrams illustrating additional example element dependency graphs, in accordance with one or more aspects of the present disclosure. FIG. 4A illustrates element dependency graph 410A and FIG. 4B illustrates element dependency graph 410B. Element dependency graph 410A describes an arrangement, in a graph form, of an infrastructure that includes core switches 412, spine switches 414, top of rack switches 416, hosts 418, and virtual machines 420. In some examples, element dependency graph 410A may be arranged as a hierarchical graph.

Element dependency graph 410B of FIG. 4B is a different example illustrating an infrastructure that includes virtual networks 422, hosts 418 and virtual machines 420. As in FIG. 4A, element dependency graph 410B may be arranged as a hierarchical graph. In some examples, the element dependency graph 410A and element dependency graph 410B may be considered static dependency graphs, since each may be based on information that changes relatively infrequently.

In the example of FIG. 4A and FIG. 4B, and in accordance with one or more aspects of the present disclosure, analytics engine 214 may generate each of element dependency graph 410A and element dependency graph 410B in response to collecting information based on interactions with policy control engine 211, adapters 207, and/or other components of policy engine 201. Further, analytics engine 214 may also observe and collect information about alerts generated by systems corresponding to element dependency graph 410A and element dependency graph 410B. Analytics engine 214 may further organize observed alerts into historical bins. Analytics engine 214 may generate, for another set of alerts, and based on the alerts organized into the historical bins, a set of impact scores for each of the alerts. The impact scores may be calculated in the manner described in connection with FIG. 3A, FIG. 3B, FIG. 3C, and FIG. 3D. In other examples, the impact scores may be calculated in a different manner. Based on the impact scores, analytics engine 214 may identify one or more root cause alerts from a larger set of alerts.

Figure 5:
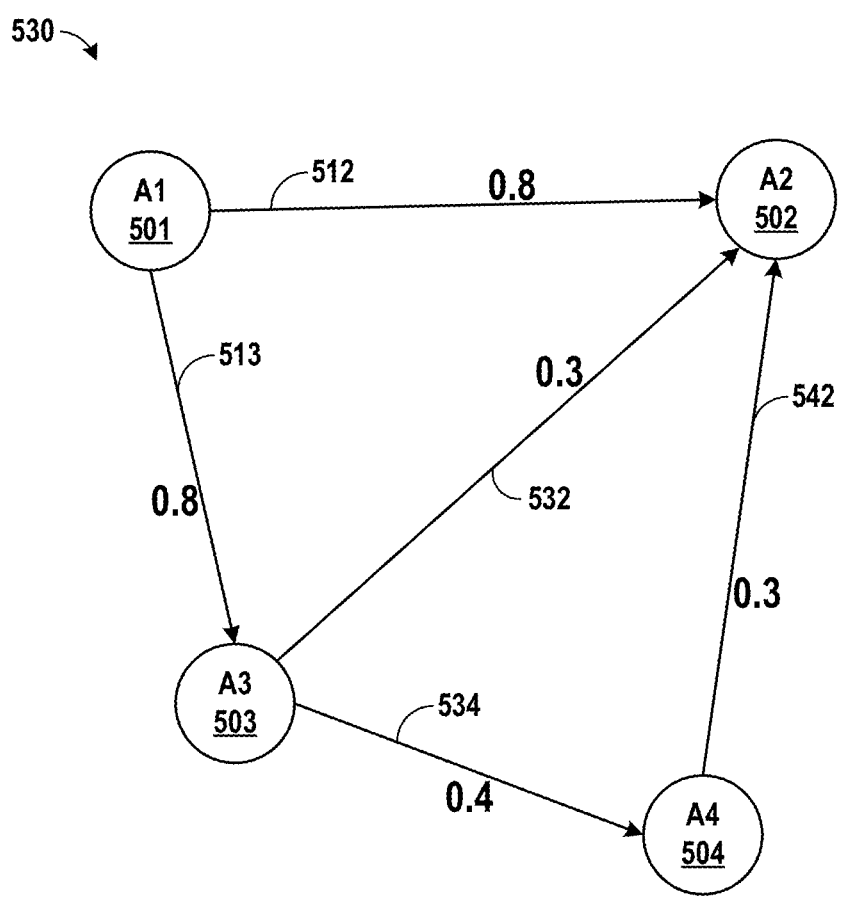
FIG. 5 is a conceptual diagram illustrating an additional example alert dependency graph, in accordance with one or more aspects of the present disclosure.

FIG. 5 is a conceptual diagram illustrating an additional example alert dependency graph, in accordance with one or more aspects of the present disclosure. Alert dependency graph 530 of FIG. 5 illustrates four nodes, each corresponding to an alert generated by a system, such as a system corresponding to that illustrated in FIG. 2 and/or depicted in FIG. 3A, FIG. 4A, or FIG. 4B. Each directional edge between nodes is labeled with a weight. For example, edge 512 between node 501 and node 502 has a weight of 0.8. In another example, edge 542 extending between node 504 and node 502 has a weight of 0.3. The weights illustrated in FIG. 5 may be calculated in the manner described in connection with FIG. 3A through FIG. 3D. In other examples, the impact scores may be calculated in a different manner.

Analytics engine 214 may determine the impact score of an alert based on the impact that the alert has on another set of alerts. For instance, analytics engine 214 may compute the impact score for alert $A_j$ as the total impact along every path from $A_j$ to $A_k$, where $A_k$ is a member of a set of alerts:

$IS(A_j)=\text{Sum}[(I([A_j \rightarrow A_k]))]$, where $I([A_j \rightarrow A_k])$ is the impact from alert $A_j$ to $A_k$.

In general, the impact along the path $A_j$ to $A_k$ may be calculated as follows: (1) If there is no node between $A_j$ and $A_k$, then $I([A_j \rightarrow A_k])$ is the edge weight; (2) If there are edges connecting $A_j$ to $A_k$, then $I([A_j \rightarrow A_k])$ is the geometric mean of the edge weights in the path from $A_j$ to $A_k$; and (3) If there are multiple paths connecting $A_j$ to $A_k$, then $I([A_j \rightarrow A_k])$ is the maximum of the geometric mean of the weights from $A_j$ to $A_k$.

Accordingly, in the example of FIG. 5, and in accordance with one or more aspects of the present disclosure, analytics engine 214 may calculate an impact score for each of node 501, node 502, node 503, and node 504 based on the edge weights illustrated in FIG. 5. For instance, with reference to the system of FIG. 2, analytics engine 214 computes the impact score of node 501 by considering all of the paths in alert dependency graph 530 from node 501 to the other alerts (node 502, node 503, and node 504). In the example of FIG. 5, there are five such paths: A1→A2, A1→A3, A1→A3→A2, A1→A3→A4, and A1→A3→A4→A2. Analytics engine 214 calculates the impact score of A1 as:

$IS(A1)=I(A1 \rightarrow A2)+I(A1 \rightarrow A3)+I(A1 \rightarrow A3 \rightarrow A2)+I(A1 \rightarrow A3 \rightarrow A4)+I(A1 \rightarrow A3 \rightarrow A4 \rightarrow A2)$ Applying the weights shown in alert dependency graph 530 of FIG. 5:

$IS(A1)=0.8+0.8+\text{squareroot}(0.3*0.8)+\text{squareroot}(0.8*0.4)+\text{cuberoot}(0.8*0.4*0.3)=3.11$ Similarly, analytics engine 214 calculates the impact score of A2, A3, and A4 as follows:

$IS(A2)=0$ (i.e., no edges exiting $A2$)

$IS(A3)=0.3+0.4+\text{squareroot}(0.4*0.3)=1.05$ $IS(A4)=0.3$

Based on the above calculations, analytics engine 214 determines that node 501 (A1) has the highest impact score (3.11), and therefore, analytics engine 214 identifies node 501 as a root cause alert in the example of FIG. 5. Although in the example described above analytics engine 214 calculates the geometric mean of edge weights, in other examples, analytics engine 214 might not use a geometric mean calculation, and may instead combine, merge, or account for multiple edge weights in a different manner without departing the spirit of the present disclosure.

Figure 6A:
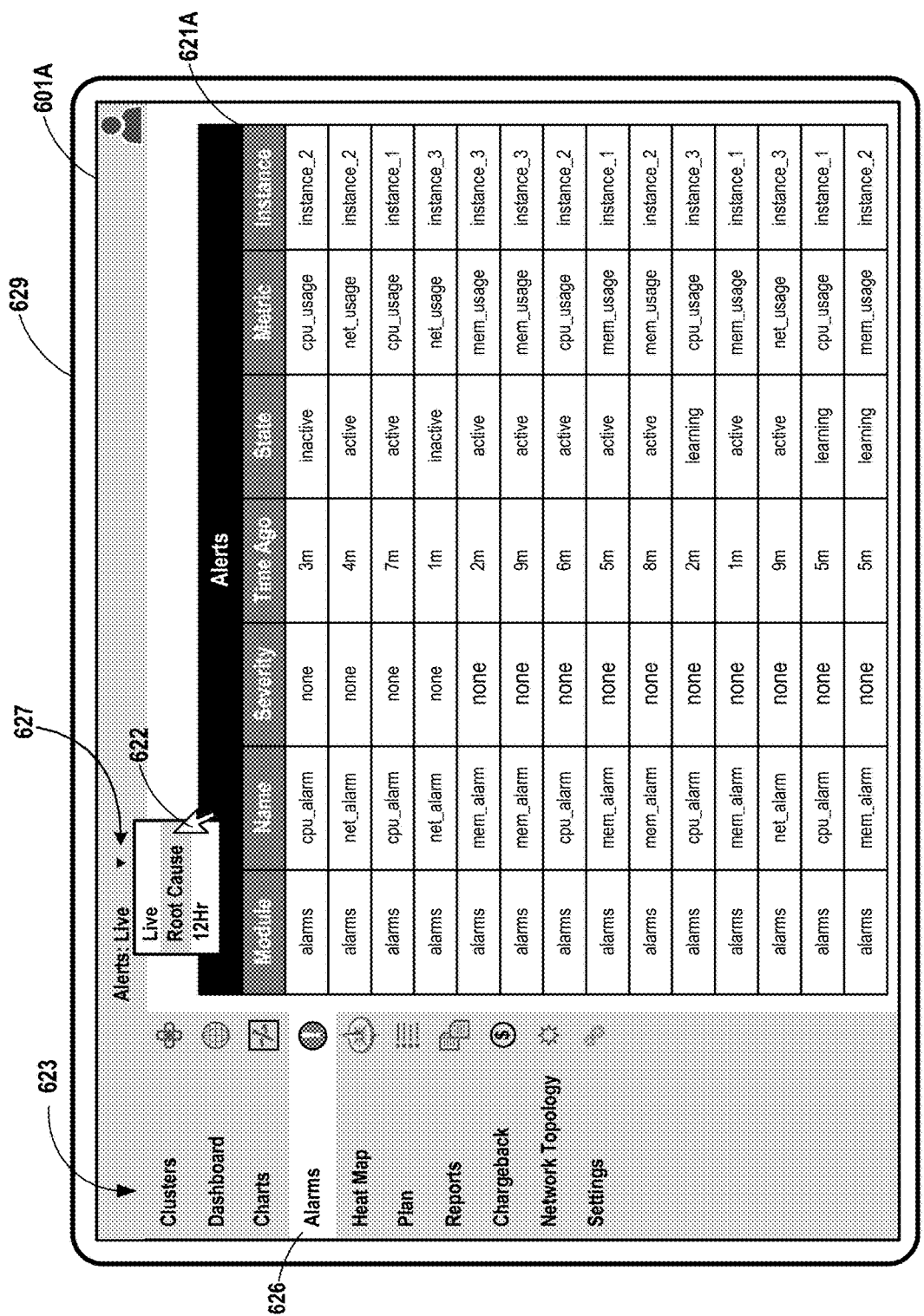
FIG. 6A and FIG. 6B are conceptual diagrams illustrating example user interfaces presented by a user interface device in accordance with one or more aspects of the present disclosure.
Figure 6B:
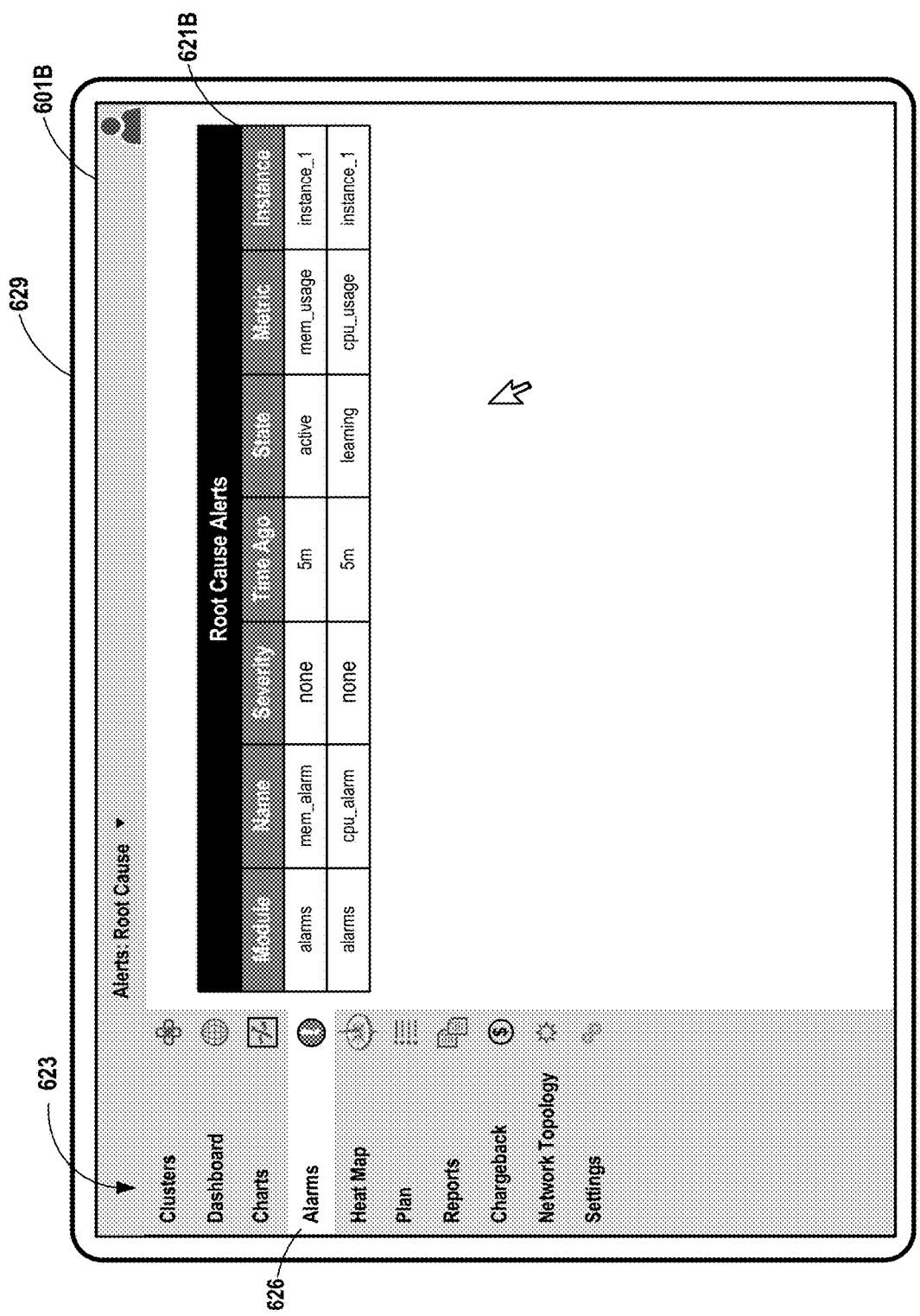

FIG. 6A and FIG. 6B are conceptual diagrams illustrating example user interfaces presented by a user interface device in accordance with one or more aspects of the present disclosure. User interface 601A illustrated in FIG. 6A and user interface 601B illustrated in FIG. 6B may each correspond to a user interface presented by user interface device 129 (e.g., within display 629). In some examples, user interface 601A and/or user interface 601B may each correspond to a user interface presented by dashboard module 233 as a dashboard 203 as described in connection with FIG. 1 and/or FIG. 2. Although the user interfaces illustrated in FIG. 6A and FIG. 6B are shown as graphical user interfaces, other types of interfaces may be presented in other examples, including a text-based user interface, a console or command-based user interface, a voice prompt user interface, or any other appropriate user interface. One or more aspects of the user interfaces illustrated in FIG. 6A and FIG. 6B may be described herein within the context of user interface device 129, policy engine 201 and server 126 of FIG. 2.

FIG. 6A illustrates an example user interface that may be presented by a computing device in response to input requesting information about alerts observed by policy engine 201. For instance, in an example that can be described with reference to FIG. 1 and FIG. 2, user interface device 129 detects input that it determines corresponds to a request, by a user, to present information about alerts observed by policy engine 201. User interface device 129 outputs to policy engine 201 an indication of input. Dashboard module 233 of policy engine 201 receives information about the input and determines that the input corresponds to a request for information about alerts associated with server 126 and/or other elements within a data center associated with policy engine 201 (e.g., data center 110 of FIG. 1). Dashboard module 233 accesses information within data manager 218 and/or analytics engine 214 and generates dashboard 203, which may include information underlying user interface 601A. Dashboard module 233 causes policy engine 201 to send information to user interface device 129. User interface device 129 receives information, and determines that the information includes information sufficient to generate a user interface. User interface device 129 generates data associated with a user interface and presents user interface 601A at display 629 as illustrated in FIG. 6A.

In the example of FIG. 6A, user interface 601A is presented within display 629, and includes sidebar 623 and alert listing 621A, with drop-down user interface component 627 along the top of user interface 601A. Sidebar 623 provides an indication of which user interface mode is being presented within user interface 601A. As illustrated in FIG. 6A, sidebar 623 may indicate one of several modes, including "Clusters" mode, "Dashboard" mode, "Charts" mode, "Alarms" mode, "Heat Map" mode, "Plan" mode, "Reports" mode, "Chargeback" mode, "Network Topology" mode, and "Settings" mode. The "Alarms" mode is selected in FIG. 6A. Alert listing 621 presents information about numerous alerts. In some situations, the alerts presented within user interface 601A might be so numerous that diagnosing problems or issues associated with data center 110 is difficult for a network administrator (or for a computerized agent) because some alerts might simply be symptoms of a problem caused by a small number of elements or resources within data center 110. Addressing such alerts might be an inefficient way to address problems or issues within data center 110. A more efficient way to address problems or issues within data center 110 may be to first address those alerts that can be characterized as the root cause of the problems and issues exhibited by data center 110.

FIG. 6B illustrates an example user interface that may be presented by a computing device in response to input requesting a set of root cause alerts. For instance, referring again to FIG. 2 and FIG. 6A, user interface device 129 detects input and outputs to policy engine 201 an indication of input. Dashboard module 233 of policy engine 201 receives information about the input and determines that the input corresponds to an interaction, by cursor 622, with drop-down user interface component 627 and a menu associated with drop-down user interface component 627. Dashboard module 233 further determines that the interaction corresponds to a request to present a list of root cause alerts from among the set of alerts presented within alert listing 621A. Dashboard module 233 accesses, generates, and/or updates dashboard 203. Dashboard module 233 causes policy engine 201 to send information to user interface device 129. User interface device 129 receives information and generates data associated with a user interface, and presents user interface 601B at display 629 as illustrated in FIG. 6B.

In the example of FIG. 6B, user interface 601B is presented within display 629, and includes alert listing 621B. Alert listing 621B is a subset of alerts, chosen from the larger set of alerts presented within alert listing 621A, that have been identified as root cause alerts. The root cause alerts presented in alert listing 621B may correspond to alerts identified as root cause alerts by analytics engine 214 in a manner consistent with the procedure described in connection with FIG. 3A through FIG. 3D, FIG. 4, and/or FIG. 5. Although two root cause alerts are shown in FIG. 6B, in other examples, only one root cause alert might be presented. In still other examples, more than two root cause alerts might be presented.

Figure 7:
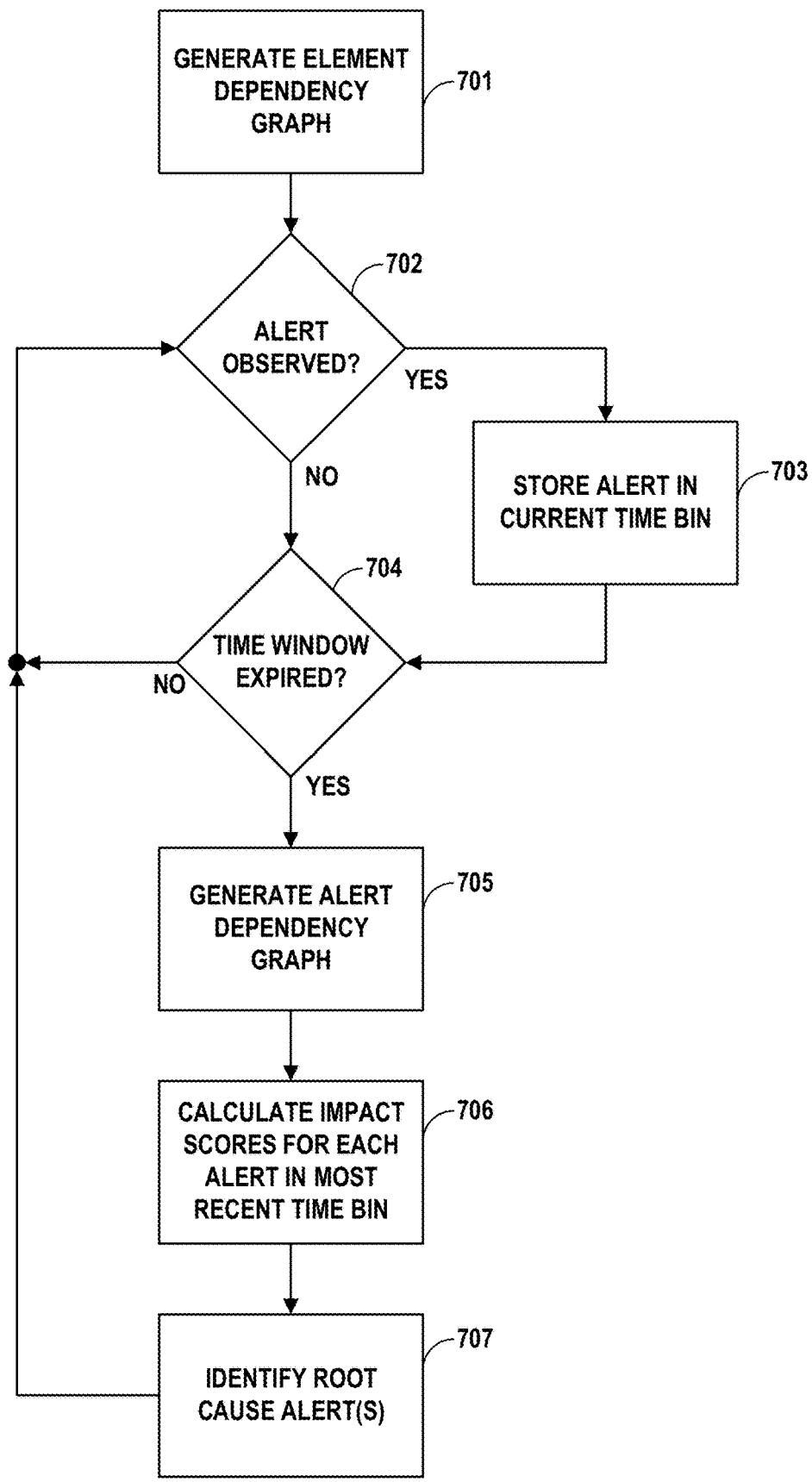
FIG. 7 is a flow diagram illustrating an example process for observing alerts and identifying root cause alerts in accordance with one or more aspects of the present disclosure.

FIG. 7 is a flow diagram illustrating an example process for observing alerts and identifying root cause alerts in accordance with one or more aspects of the present disclosure. In the example of FIG. 7, the illustrated operations may be performed by analytics engine 214 in the context illustrated in FIG. 2. In other examples, different operations may be performed, or operations described in connection with FIG. 7 may be performed by one or more other components, modules, systems, and/or devices. Further, in other examples, operations described in connection with FIG. 7 may be merged, performed in a difference sequence, or omitted.

In the example of FIG. 7, and in accordance with one or more aspects of the present disclosure, analytics engine 214 may generate an element dependency graph (701). For example, with reference to FIG. 2, analytics engine 214 interacts with policy control engine 211, adapters 207, and/or other components of policy engine 201 to collect information about the infrastructure being monitored. Analytics engine 214 generates, based on such interactions and information, a data structure corresponding to an element dependency graph similar to that illustrated in FIG. 3A, FIG. 4A and/or FIG. 4B.

Analytics engine 214 may observe an alert (702). For instance, still referring to FIG. 2, policy agent 205 of server 126 monitors resources of server 126. In response to the monitoring, policy agent 205 generates alerts and places the alerts on message bus 215. Analytics engine 214 monitors message bus 215 and observes alerts on message bus 215.

Analytics engine 214 may store the alert in a time bin (703). For instance, analytics engine 214 stores information about the observed alerts, and organizes the stored alerts into a series of consecutive time bins. In some examples, the time bins may of a fixed time length (e.g., 6 minutes each). In other examples, the time bins may be of variable time lengths (e.g., ranging from 5-15 minutes in length).

Analytics engine 214 may determine that the window associated with the current time bin has expired (704). For instance, analytics engine 214 may determine that the time period for the current time bin has expired, and the window for adding new alerts has closed. In response, analytics engine 214 may generate an alert dependency graph (705). For instance, analytics engine 214 generates an alert dependency graph in the manner described in connection with FIG. FIG. 3C. Analytics engine 214 creates the alert dependency graph based on the alerts stored in the most recent time bin, and for historical bins of alerts, analytics engine 214 uses the set of consecutive time bins that analytics engine 214 observed just prior to the most recent time bin. Analytics engine 214 may use a rolling set or sliding window of historical bins, so that a number of recent time bins are used as historical bins, and the earliest bins are eventually removed from the window, replaced by newer historical bins.

Analytics engine 214 may calculate impact scores for each alert in the most recent time bin (706). Analytics engine 214 uses the historical bins and the most recent time bin to calculate impact scores in the manner described in connection with FIG. 3A through FIG. 3D, and/or FIG. 5.

Analytics engine 214 may identify one or more root cause alerts (707). For instance, analytics engine 214 identifies one or more root cause alerts based on the calculated impact scores. Analytics engine 214 thereafter begins a new time bin, and resumes storing information about observed alerts in the new time bin (702).

Subject matter related to aspects of this disclosure is found in one or more of the following applications, each of which is hereby incorporated by reference as if fully set forth herein: (1) U.S. Patent Application No. 62/478,515, filed Mar. 29, 2017, and entitled MICRO-LEVEL MONITORING, VISIBILITY AND CONTROL OF SHARED RESOURCES INTERNAL TO A PROCESSOR OF A HOST MACHINE FOR A VIRTUAL ENVIRONMENT (2) U.S. patent application Ser. No. 15/637,686, filed Jun. 29, 2017, and entitled NETWORK DASHBOARD WITH MULTIFACETED UTILIZATION VISUALIZATIONS, and (3) U.S. patent application Ser. No. 15/637,716, filed Jun. 29, 2017, and entitled NETWORK DASHBOARD WITH MULTIFACETED UTILIZATION VISUALIZATIONS.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    observing, by a computing system and over a plurality of time bins, a plurality of alerts generated in response to monitoring resources associated with a plurality of connected elements within a network, wherein the plurality of alerts includes a first alert and a second alert, and wherein each of the plurality of alerts occurs within one or more of the plurality of time bins;
    determining, by the computing system, an occurrence count for each of the plurality of alerts, wherein the occurrence count represents a count of the time bins in which a respective alert occurs;
    determining, by the computing system, a concurrent occurrence count for each pair of alerts within the plurality of alerts, wherein the concurrent occurrence count represents a count of the time bins during which both alerts within the corresponding pair of alerts occurs;
    identifying, by the computing system and based on the occurrence count for each of the plurality of alerts and the concurrent occurrence count for each pair of alerts, a root cause alert included within the plurality of alerts, wherein identifying the root cause alert includes:
        identifying an edge weight for the first alert by dividing the concurrent occurrence count for the first alert and the second alert by the occurrence count for the first alert, and
        identifying an edge weight for the second alert by dividing the concurrent occurrence count for the first alert and the second alert by the occurrence count for the second alert; and
    outputting, by the computing system, a user interface identifying the root cause alert included in the plurality of alerts.

2. The method of claim 1, wherein identifying the root cause alert further includes:
    calculating an impact score for the first alert by summing edge weights associated with the first alert; and
    calculating an impact score for the second alert by summing edge weights associated with the second alert.

3. The method of claim 2, wherein identifying the root cause alert further includes:
    determining that the impact score for the first alert is greater than the impact score for the second alert; and
    identifying, based on determining that the impact score for the first alert is greater than the impact score for the second alert, the first alert as the root cause alert.

4. The method of claim 1, wherein the plurality of alerts includes a first alert and a second alert, and wherein outputting the user interface includes:
    presenting information about each of plurality of alerts, including the first alert and the second alert; and
    responsive to detecting input, presenting information identifying the first alert as the root cause alert.

5. The method of claim 4, wherein presenting information about each of plurality of alerts includes:
    presenting, for each of the plurality of alerts, information relating to one or more of an alert module, an alert name, an alert severity, an amount of time since an alert was triggered, an alert state, an alert metric, and an alert instance.

6. The method of claim 1, wherein identifying the root cause alert includes:
    generating element dependency information for the plurality of connected elements within the network;
    generating, based on the first alert and the second alert, an alert dependency graph, wherein the alert dependency graph includes a node for each of the first alert and the second alert; and
    identifying, based on the element dependency information, pairs of related nodes.

7. A system comprising:
    a storage system; and
    processing circuitry having access to the storage device and configured to:
        observe, over a plurality of time bins, a plurality of alerts generated in response to monitoring resources associated with a plurality of connected elements within a network, wherein the plurality of alerts includes a first alert and a second alert, and wherein each of the plurality of alerts occurs within one or more of the plurality of time bins,
determine an occurrence count for each of the plurality of alerts, wherein the occurrence count represents a count of the time bins in which a respective alert occurs,
determine a concurrent occurrence count for each pair of alerts within the plurality of alerts, wherein the concurrent occurrence count represents a count of the time bins during which both alerts within the corresponding pair of alerts occurs,
identify, based on the occurrence count for each of the plurality of alerts and the concurrent occurrence count for each pair of alerts, a root cause alert included within the plurality of alerts, wherein to identify the root cause alert, the processing circuitry is configured to:
identify an edge weight for the first alert by dividing the concurrent occurrence count for the first alert and the second alert by the occurrence count for the first alert, and
identify an edge weight for the second alert by dividing the concurrent occurrence count for the first alert and the second alert by the occurrence count for the second alert, and
output a user interface identifying the root cause alert included in the plurality of alerts.

8. The system of claim 7, wherein to identify the root cause alert, the processing circuitry is further configured to:
calculate an impact score for the first alert by summing edge weights associated with the first alert; and
calculate an impact score for the second alert by summing edge weights associated with the second alert.

9. The system of claim 8, wherein to identify the root cause alert, the processing circuitry is further configured to:
determine that the impact score for the first alert is greater than the impact score for the second alert; and
identify, based on determining that the impact score for the first alert is greater than the impact score for the second alert, the first alert as the root cause alert.

10. The system of claim 7, wherein the plurality of alerts includes a first alert and a second alert, and wherein to output the user interface, the processing circuitry is further configured to:
present information about each of plurality of alerts, including the first alert and the second alert; and
responsive to detecting input, present information identifying the first alert as the root cause alert.

11. The system of claim 10, wherein to present information about each of plurality of alerts, the processing circuitry is further configured to:
present, for each of the plurality of alerts, information relating to one or more of an alert module, an alert name, an alert severity, an amount of time since an alert was triggered, an alert state, an alert metric, and an alert instance.

12. The system of claim 8, wherein to identify the root cause alert, the processing circuitry is further configured to:
generate element dependency information for the plurality of connected elements within the network;
generate, based on the first alert and the second alert, an alert dependency graph, wherein the alert dependency graph includes a node for each of the first alert and the second alert; and
identify, based on the element dependency information, pairs of related nodes.

13. A non-transitory computer-readable storage medium comprising instructions that, when executed, configure processing circuitry of a computing system to:
observe, over a plurality of time bins, a plurality of alerts generated in response to monitoring resources associated with a plurality of connected elements within a network wherein the plurality of alerts includes a first alert and a second alert, and wherein each of the plurality of alerts occurs within one or more of the plurality of time bins;
determine an occurrence count for each of the plurality of alerts, wherein the occurrence count represents a count of the time bins in which a respective alert occurs;
determine a concurrent occurrence count for each pair of alerts within the plurality of alerts, wherein the concurrent occurrence count represents a count of the time bins during which both alerts within the corresponding pair of alerts occurs;
identify, based on the occurrence count for each of the plurality of alerts and the concurrent occurrence count for each pair of alerts, a root cause alert included within the plurality of alerts, wherein to identify the root cause alert, the processing circuitry is configured to:
identify an edge weight for the first alert by dividing the concurrent occurrence count for the first alert and the second alert by the occurrence count for the first alert, and
identify an edge weight for the second alert by dividing the concurrent occurrence count for the first alert and the second alert by the occurrence count for the second alert; and
output a user interface identifying the root cause alert included in the plurality of alerts.

14. The non-transitory computer-readable storage medium of claim 13, wherein the instructions that configure the processing circuitry to identify the root cause alert include instructions that further configure the processing circuitry to:
calculate an impact score for the first alert by summing edge weights associated with the first alert; and
calculate an impact score for the second alert by summing edge weights associated with the second alert.

15. The non-transitory computer-readable storage medium of claim 14, wherein the instructions that configure the processing circuitry to identify the root cause alert include instructions that further configure the processing circuitry to:
determine that the impact score for the first alert is greater than the impact score for the second alert; and
identify, based on determining that the impact score for the first alert is greater than the impact score for the second alert, the first alert as the root cause alert.

16. The non-transitory computer-readable storage medium of claim 13, wherein the instructions that configure the processing circuitry to identify the root cause alert include instructions that further configure the processing circuitry to:
generate element dependency information for the plurality of connected elements within the network;
generate, based on the first alert and the second alert, an alert dependency graph, wherein the alert dependency graph includes a node for each of the first alert and the second alert; and
identify, based on the element dependency information, pairs of related nodes.

17. The non-transitory computer-readable storage medium of claim 13, wherein the plurality of alerts includes a first alert and a second alert, and wherein the instructions that configure the processing circuitry to output the user interface include instructions that further configure the processing circuitry to:
- present information about each of plurality of alerts, including the first alert and the second alert; and
- responsive to detecting input, present information identifying the first alert as the root cause alert.

* * * * *